United States Patent
Lei et al.

(10) Patent No.: US 12,262,420 B2
(45) Date of Patent: Mar. 25, 2025

(54) SYSTEMS AND METHODS FOR LATENCY REDUCTION FOR 2-STEP RANDOM ACCESS CHANNEL (RACH) HYBRID AUTOMATIC REPEAT REQUESTS (HARQ)

(71) Applicant: QUALCOMM Incorporated, San Diego, CA (US)

(72) Inventors: Jing Lei, San Diego, CA (US); Muhammad Nazmul Islam, Littleton, MA (US); Linhai He, San Diego, CA (US); Amir Aminzadeh Gohari, Santa Clara, CA (US); Yuanning Yu, Santa Clara, CA (US); Enoch Shiao-Kuang Lu, San Diego, CA (US); Yi Huang, San Diego, CA (US); Ruiming Zheng, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/754,465

(22) PCT Filed: Oct. 2, 2019

(86) PCT No.: PCT/CN2019/109800
§ 371 (c)(1),
(2) Date: Apr. 1, 2022

(87) PCT Pub. No.: WO2021/062864
PCT Pub. Date: Apr. 8, 2021

(65) Prior Publication Data
US 2022/0377801 A1    Nov. 24, 2022

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/006* (2013.01)

(58) Field of Classification Search
CPC ................................................ H04W 74/0833
See application file for complete search history.

(56) References Cited

U.S. PATENT DOCUMENTS

| 10,405,342 B2 | 9/2019 | Wang et al. |
| 12,022,525 B2 * | 6/2024 | Huang .............. H04W 74/0833 |

(Continued)

FOREIGN PATENT DOCUMENTS

| CN | 108282897 A | 7/2018 |
| WO | 2016168024 A1 | 10/2016 |

(Continued)

OTHER PUBLICATIONS

International Search Report and Written Opinion—PCT/CN2019/109800—ISA/EPO—Jun. 30, 2020.

(Continued)

*Primary Examiner* — Shukri Taha
(74) *Attorney, Agent, or Firm* — Haynes and Boone, LLP

(57) ABSTRACT

Wireless communications systems and methods related to the timing arrangements and the transmission gap configurations in 2-step random access channel (RACH) procedures to improve system latency and reliability of a RACH HARQ process are provided. The UE transmits a first message including a random access preamble and a payload, and then monitors for a second message in response to the first message during a random access response (RAR) window. In response to determining that no second message is received by the UE from the BS or a back off indicator is received within the RAR window, the UE re-transmits the preamble and payload of the first message after the RAR window lapses. In response to determining if the second (Continued)

message received within the RAR window carries a FallbackRAR or SuccessRAR, the UE then determines to retransmit the payload of the first message based on the FallbackRAR, or to transmit an acknowledgement message based on the SuccessRAR.

35 Claims, 14 Drawing Sheets

(56) References Cited

U.S. PATENT DOCUMENTS

| | | | | |
|---|---|---|---|---|
| 2020/0404708 | A1* | 12/2020 | Zhang | H04W 74/0833 |
| 2021/0051707 | A1* | 2/2021 | Rastegardoost | H04L 5/0051 |

FOREIGN PATENT DOCUMENTS

| | | |
|---|---|---|
| WO | 2018054163 A1 | 3/2018 |
| WO | 2018085428 A1 | 5/2018 |

OTHER PUBLICATIONS

Nokia et al., "Feature Lead Summary#3 on 2 Step RACH Procedures", 2-Step RACH Procedure Feature Lead Summary RAN1#97, 3GPP TSG RAN WG1 #97, R1-1907900, Reno, USA, May 13, 2017-May 17, 2019, May 17, 2019 (May 17, 2019), XP051740159, pp. 1-59, Retrieved from the Internet: URL: http://www.3gpp.org/ftp/tsg%5Fran/WG1%5FRL1/TSGR1%5F97/Docs/R1%2D1907900%2Ezip.

3GPP TS 36.321: "3rd Generation Partnership Project, Technical Specification Group Radio Access Network, Evolved Universal Terrestrial Radio Access (E-UTRA), Medium Access Control (MAC) protocol specification (Release 15)", 3GPP TS 36.321 V15.7.0, Sep. 2019, 134 Pages.

Taiwan Search Report—TW109133061—TIPO—Mar. 27, 2024.

Fujitsu: "Discussion on back off indication in 2-step RACH", 3GPP TSG-RAN WG2 Meeting #107, R2-1909998, 3rd Generation Partnership Project (3GPP), Mobile Competence Centre, 650, Route Des Lucioles, F-06921 Sophia-Antipolis, Cedex, Vol. RAN WG2, No. Prague, Czech, Aug. 26, 2019-Aug. 30, 2019, Aug. 16, 2019, 5 Pages, XP051767784, Paragraph [03.1].

Qualcomm Incorporated: "Procedures for Two-Step RACH", 3GPP Draft, 3GPP TSG-RAN WG1 Meeting #98, R1-1909240, Procedures for Two-Step RACH, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765845, 15 Pages, The Whole Document, Paragraph [0002], [0004], Figure 5.

Samsung: "Fallback from 2 Step to 4 Step RACH", 3GPP TSG-RAN2 106, R2-1905721, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2017-May 17, 2019, May 13, 2019, 3 Pages, XP051729220, Paragraph [0002].

Supplementary European Search Report—EP19948167—Search Authority—The Hague—Mar. 30, 2023.

* cited by examiner

SYSTEMS AND METHODS FOR LATENCY REDUCTION FOR 2-STEP RANDOM ACCESS CHANNEL (RACH) HYBRID AUTOMATIC REPEAT REQUESTS (HARQ)

PRIORITY CLAIM(S)

The present application is a national stage application of and claims priority under 35 U.S.C. 371 PCT International Application No. PCT/CN2019/109800, filed Oct. 2, 2019. The present application further claims priority to Taiwanese application no. 109133061, filed Sep. 24, 2020. The aforementioned applications are hereby expressly incorporated herein by reference in their entireties.

TECHNICAL FIELD

The application technology discussed below relates to wireless communication systems, and more particularly to reducing latency in the retransmission scheme of 2-step random access channel (RACH) hybrid automatic repeat requests (HARQ), which may be utilized in $5^{th}$ Generation (5G) new radio (NR) networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

In a wireless system, BSs may broadcast synchronization signals such as primary synchronization signal (PSS), secondary synchronization signal (SSS), and extended synchronization signal (ESS), beam reference signal (BRS) and system information in a plurality of directional beams. In addition, the BSs may transmit other reference signals, such as channel state information reference signal (CSI-RS), over the beams to enable UEs to measure channels between the BS and corresponding UEs. A UE may perform initial cell acquisition by listening to the broadcast signals and perform signal measurements based on the synchronization signals, the BRS and/or other signals. The UE may determine receive signal strengths based on the received signals and select a cell and a beam within the selected cell for performing an access procedure.

To perform an access procedure, a UE may initiate a random access channel (RACH) procedure by sending a random access preamble using the same subairay and beam direction as the selected beam and monitor for a random access response (RAR) in a RAR window. When the BS detects the random access preamble, the BS sends a RAR to the UE in the same beam direction as the random access preamble is received. The RAR may include a transmission opportunity for the UE to send a next random access message. Due to beam correspondence, user mobility, rotation, and/or signal blockage, beam characteristics may be varied over time or are different between uplink and downlink at the UE or BS. Thus, the UE may fail to receive the RAR. Upon failing to receive the RAR within the RAR window, the UE may have the option to retry the RACH procedure after the RAR window expires. However, the UE may need to wait for a significant amount of time (e.g., at least until the RAR window expires plus an additional back-off time) whenever a retransmission is implemented. Accordingly, a retransmission can cause significant system latency.

Therefore, there is a need to improve latency performance in the RACH procedure in wireless communication systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), system information for initiating a random access channel (RACH) procedure. The method further includes transmitting, by the UE to the BS, a first message including a random access preamble and a first payload of a connection request, and monitoring, by the UE from the BS, for a second message in response to the first message during a random access response (RAR) window. The method further includes re-transmitting, by the UE to the BS, the first message in response to determining based on the monitoring that no second message is received by the UE from the BS within the RAR window. The method further includes determining, by the UE, whether to re-transmit the first payload to the BS or transmit an acknowledgement message to the BS in response to determining that the second message is received by the UE from the BS within the RAR window, based on a type of a second payload decoded from the second message.

In another aspect of the disclosure, a method of wireless communication includes broadcasting, by a BS to a UE, system information for initiating a random access channel procedure. The method further includes receiving, by the BS from the UE, a first message including a random access preamble and a first payload of a connection request, and determining, by the BS, whether at least a portion of the first message is decodable. The method further includes refraining from transmitting any message to the UE within a random access response (RAR) window in response to a decoding failure of the first message. The method further includes transmitting, by the BS to the UE, a RAR message containing a second payload that is determined based on a type of the portion of the first message in response to a decoding success of at least the portion of the first message.

In another aspect of the disclosure, a UE of wireless communication includes a transceiver configured to receive system information for initiating a random access channel (RACH) procedure, transmit a first message including a random access preamble and a first payload of a connection request, monitor for a second message in response to the first message during a random access response (RAR) window, and re-transmit the first message in response to determining based on the monitoring that no second message is received by the UE from the BS within the RAR window. The UE further includes a processor configured to determine whether to re-transmit the first payload to the BS or transmit an acknowledgement message to the BS in response to determining that the second message is received by the UE from the BS within the RAR window, based on a type of a second payload decoded from the second message.

In another aspect of the disclosure, a BS of wireless communication includes a transceiver configured to broadcast system information for initiating a random access channel procedure, receive a first message including a random access preamble and a first payload of a connection request. The BS further includes a processor configured to determine whether at least a portion of the first message is decodable, refrain from transmitting any message to the UE within a random access response (RAR) window in response to a decoding failure of the first message. The transceiver is further configured to transmit a RAR message containing a second payload that is determined based on a type of the portion of the first message in response to a decoding success of at least the portion of the first message.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
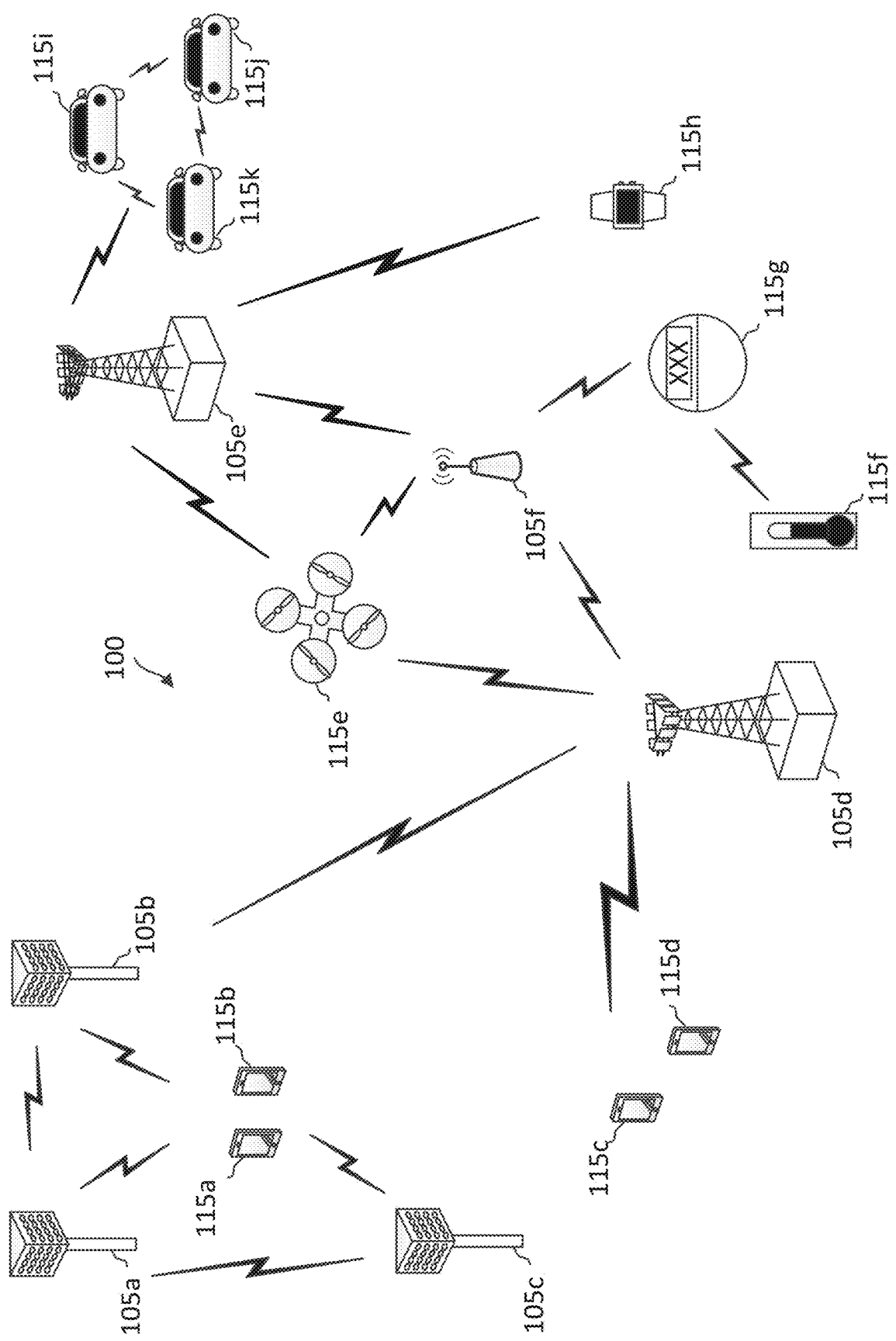
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless system, when a UE wants to access the network, the UE may attempt to try to attach or synchronize with the BS. In order to be synchronized with the network, a RACH procedure is used. For example, traditionally, a 4-step RACH procedure is used for UE to establish a synchronized connection with BS. Specifically, in system information block (SIB2), BS such as the next generation node B (gNB) periodically broadcasts several parameters such as root sequence ID, RACH configuration index, power offset, and initial power. In a contention-based RACH procedure, the UE randomly selects a preamble out of the 54 orthogonal zadoff-chu (ZC) sequences generated by root sequence cyclic shift, which is transmitted as Msg 1 on the random access subframe in time and resource block (RB) in frequency implicitly defining the RA-radio network temporary identifier (RA-RNTI). The gNB responds with Msg 2 random access response (RAR) containing a temporary cell-RNTI (C-RNTI), timing advance (TA) and uplink resource grant upon Msg 1 success. In Msg 3, the UE transmits a radio resource control (RRC) connection request including a randomly chosen initial device identity after decoding the RB assignment from Msg 2. Multiple UEs can select the same preamble, RA-RNTI in Msg 1 and also the corresponding C-RNTI in Msg 2 and transmit their own Msg 3 on the uplink resources which is detected as a collision by gNB. In Msg 4, the gNB sends RRC connection setup with a permanent C-RNTI and an echo of the initial identity transmitted in Msg 3 by the device. RACH procedure is considered as a success if the identities are matched else the device retries the procedure after a back-off interval. The successful UE is ready to transmit uplink data.

To lower the access delay of the 4-step RACH access procedure, a 2-step RACH procedure can be used, in which the UE combines Msg1 and Msg3 into one initial message, and the BS in turn responds with a combined message of the traditional Msg2 and Msg4. In accordance with aspects of the present disclosure, the 2-step RACH procedure, as further described in relation to FIGS. 3A-3C, can include a timeline mechanism for implementing a hybrid automatic repeat request (HARQ) in order to avoid excessive latency if and when the UE makes a retransmission.

In view of a desire to reduce overall latency in the 2-step RACH procedure, aspects described herein provide timeline designs for the retransmission scheme in the 2-step RACH procedure with improved system latency. Specifically, as further described in relation to FIGS. 6A-10, various timing parameters are adopted to align the transmission and/or retransmission of messages in the 2-step RACH procedure. With the defined timeline arrangements, the overall latency of the 2-step RACH procedure is improved.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
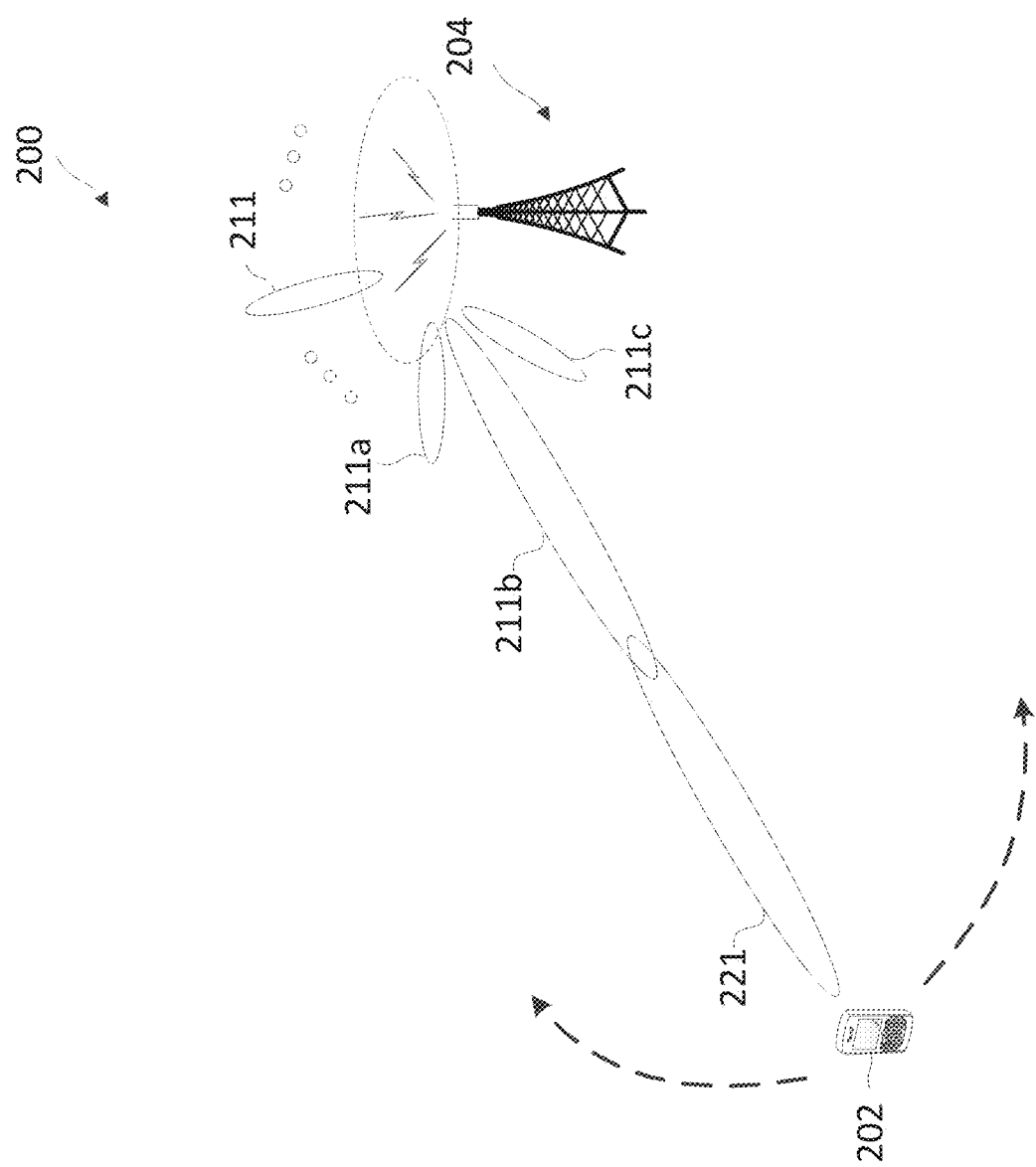
FIG. 2 illustrates a random access scheme in the wireless communication network shown in FIG. 1, according to aspects of the present disclosure.

FIG. 2 illustrates a random access scheme in a wireless communication network 200 according to aspects of the present disclosure. The network 200 corresponds to a portion of the network 100. FIG. 2 illustrates one BS 204 and one UE 202 for purposes of simplicity of discussion, though it will be recognized that aspects of the present disclosure may scale to many more UEs 202 and/or BSs 204. The BS 204 corresponds to one of the BSs 104. The UE 202 corresponds to one of the UEs 102. The UE 202 and BS 204 may communicate with each other at any suitable frequencies.

In FIG. 2, BS 204 sends synchronization signals, BRSs, and system information over a plurality of directional beams 211 in a plurality of directions as shown by the dashed oval 220. To access the network 200, UE 202 listens to the synchronization signals and/or the BRSs and selects a beam for performing a random access procedure. For example, UE 202 can receive the beams 211a, 211b, and 211c and selects the beam 211b for the random access. The UE 202 sends a random access preamble over a beam 221 in the beam direction of the beam 211b and monitors for a RAR from BS 204. Upon detecting the random access preamble, BS 204 sends a RAR over the beam 211b in the same beam direction at which the random access preamble is received. The BS 204 sends the RAR over the beam 211b using an entire subframe. This can be resource inefficient when a large bandwidth is available. In addition, by the time BS 204 sends the RAR, UE 202 may have moved to a different location away from the beam 211b as shown by the dashed arrows. Thus, UE 202 may fail to receive the RAR from the beam 211b. An additional cause of RAR failure may be due to beam correspondence. Although UE 202 may retry for another random access attempt after waiting for a period of time (e.g., a backoff period), the retry adds additional latency. Thus, sending a single random access preamble over a single beam direction per random access attempt may not be robust enough to successfully complete the RACH procedure.

Figure 3A:
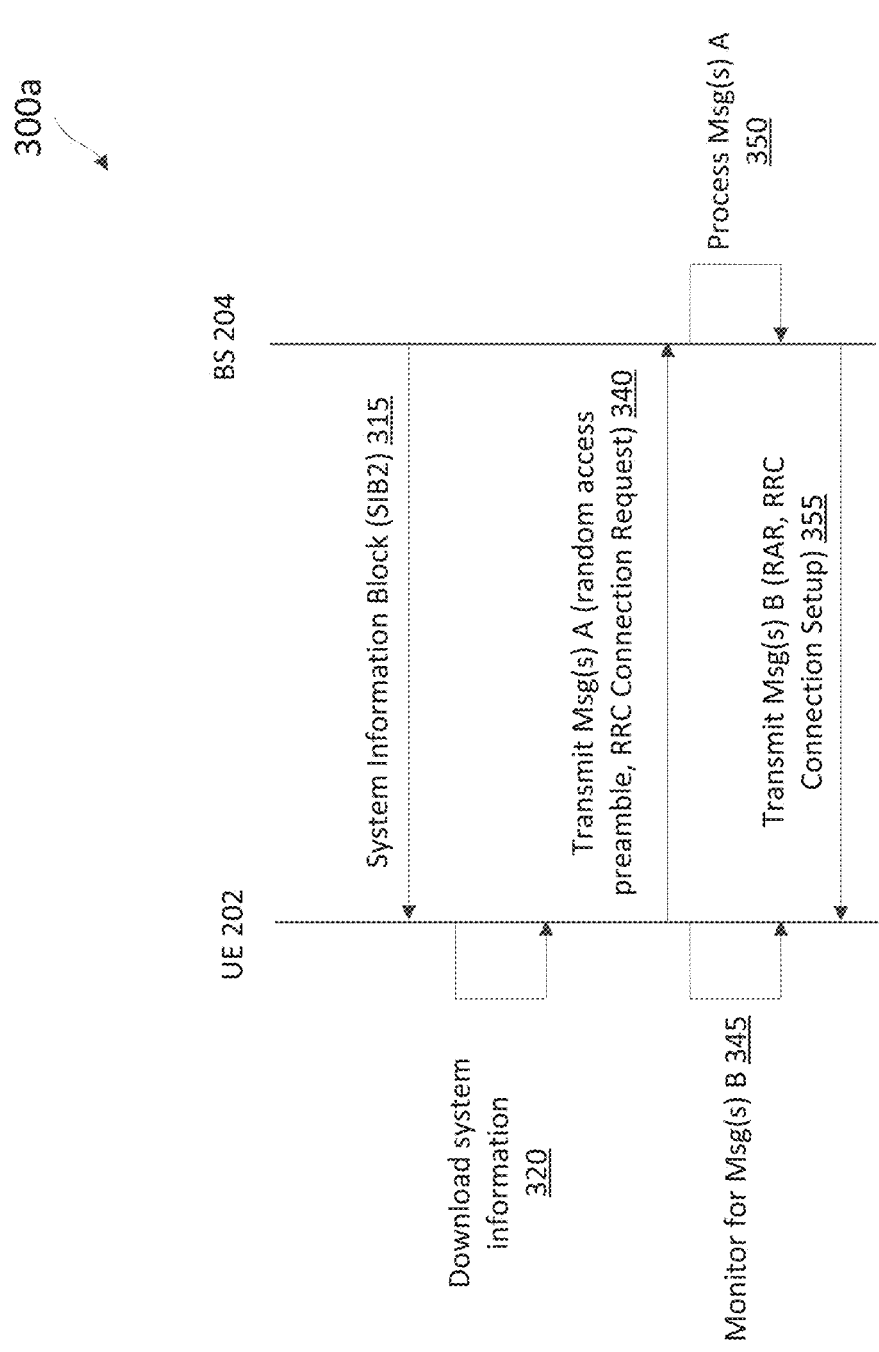
FIGS. 3A-3C illustrates various transmission scenarios of a 2-step RACH scheme between a UE and a BS that may be implemented in the wireless communication network shown in FIGS. 1-2, according to some aspects of the present disclosure.
Figure 3B:
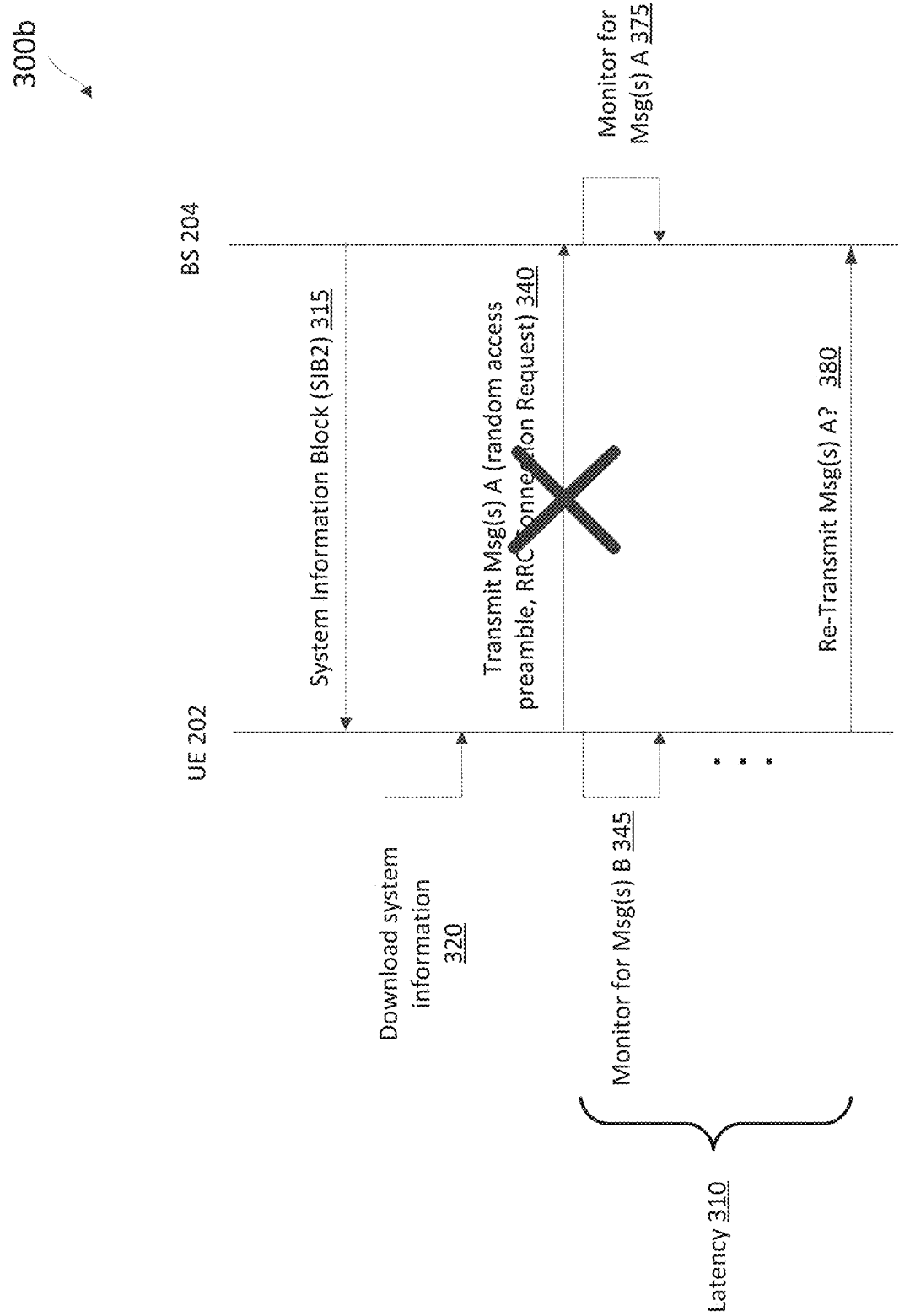
Figure 3C:
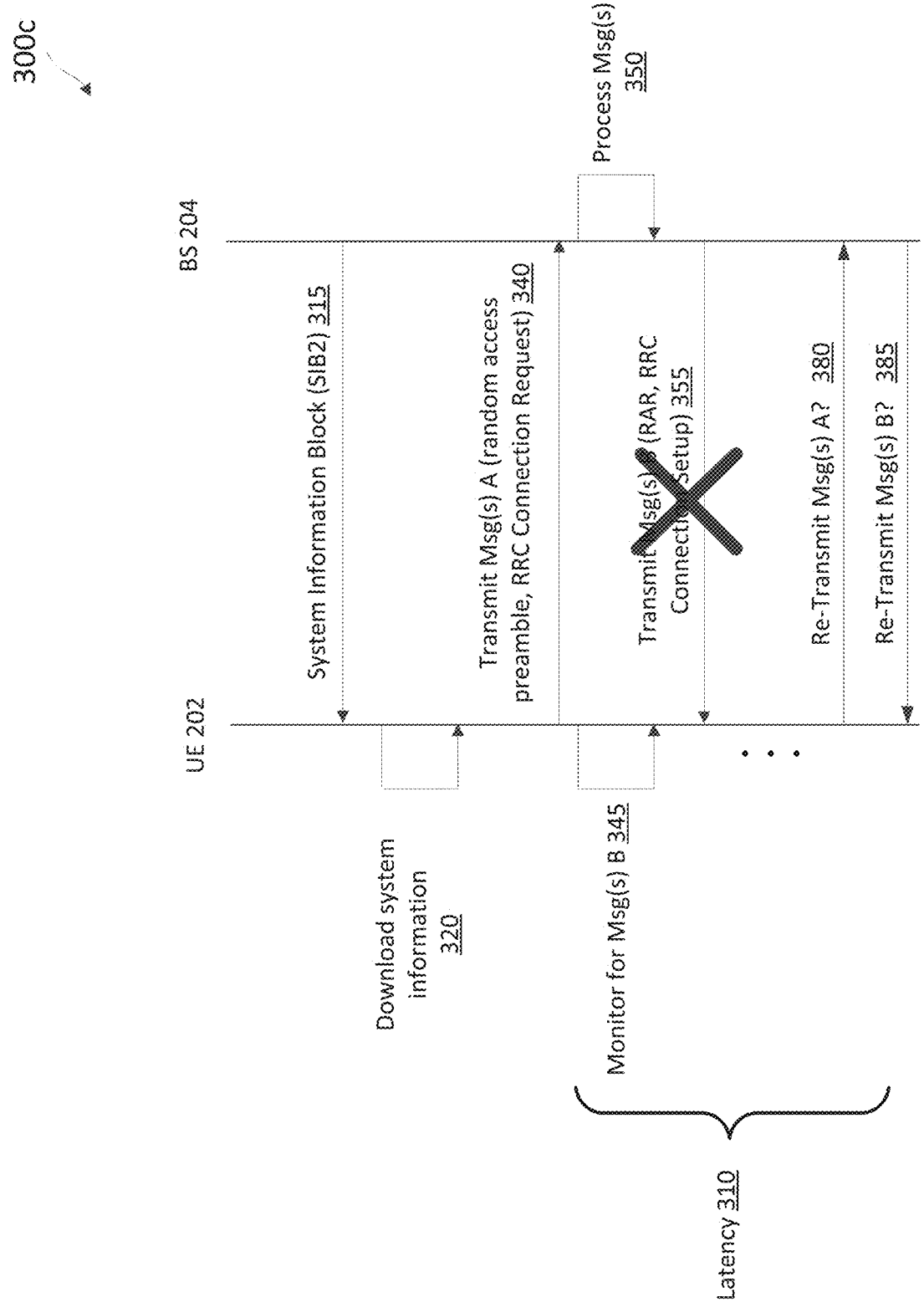

FIGS. 3A-3C illustrates various transmission scenarios of a 2-step RACH scheme between a UE 202 and a BS 204 that may be implemented in the wireless communication network shown in FIGS. 1-2, according to some aspects of the present disclosure.

Diagram 300a in FIG. 3A shows a 2-step RACH procedure that lowers the access delay in the control plane as compared to the traditional 4-step RACH. After the system information block (e.g., SIB2) and RRC signaling is transmitted to UE 202 from BS 204 at 315, and UE 202 decodes the system information and RRC signaling at 320, UE 202 transmits a Msg A that carries the standard 4-step LTE RACH Msg 1 and Msg 3, e.g., including a random access preamble followed by the payload for the random access message (connection request, device ID, buffer status report, etc.) at 340. UE 202 then monitors for a Msg B from BS 204 at 345 while BS 204 processes and decodes Msg A at 350. The Msg B is transmitted from BS 204, which corresponds to the Msg 2 and Msg 4 of standard 4-step LTE RACH, e.g., the RAR, timing advance and finally the connection complete with RRC response message at 355. Thus, the 2-step RACH is able to set up a connection between UE 202 and BS 204 for UE 202 to start transmitting uplink data with a reduced access delay, e.g., 2 message exchange vs. traditional 4 message exchange.

Diagram 300b in FIG. 3B shows a scenario for retransmission when BS 204 fails to receive the MsgA preamble or payload. For example, due to channel collision, channel fading or interference, the MsgA transmission 340 may not be successful. The BS 204 may monitor for Msg A at 375, but fails to receive anything. Or BS 204 may receive a corrupted MsgA but fails to decode the preamble or the payload from the corrupted version. In this case, BS 204 may not respond with a MsgB to UE 202. The UE 202 may monitor for MsgB 345 for a period of time, and attempt to re-transmit MsgA at 380. As the waiting time for UE 202 to monitor for MsgB 345 or the retransmission scheme is not specified by the 2-step RACH, additional latency 310 can be incurred in the retransmission process.

Diagram 300c in FIG. 3B shows another scenario for retransmission when UE 202 fails to receive the MsgB from BS 204. For example, even if BS 204 successfully receives and decodes the MsgA at 350, and then transmits MsgB to UE 202 in response to MsgA at 355, the transmission of MsgB at 355 may not be successful due to channel impairments, receiver malfunction at UE 202, etc. In this case, UE 202 may monitor for MsgB 345 for a period of time but fails to receive anything, or only receives a corrupted version of MsgB that cannot be decoded. When UE 202 fails to receive or decode a RAR response from MsgB in response to the transmitted MsgA, similar to the scenario in diagram 300b, UE 202 may again attempt to re-transmit MsgA at 380 and subsequently BS 204 may attempt to re-transmit MsgB at 385. As the retransmission timeline of MsgA or MsgB is not defined in the 2-step RACH, additional latency 310 can be incurred if UE 202 waits for an indefinite period of time for retransmission.

In view of the need to reduce overall latency in the 2-step RACH procedure, aspects described herein provide timeline designs for the retransmission scheme in the 2-step RACH procedure with improved system latency. Specifically, as further described in relation to FIGS. 6A-10, MsgA or MsgB may be retransmitted depending on the specific scenario of decoding failure at UE 202 or BS 204, and various timing parameters are adopted to align the transmission or retransmission of MsgA and MsgB in the 2-step RACH procedure. With the defined timeline arrangements in retransmission, the overall latency of the 2-step RACH procedure is improved.

Figure 4:
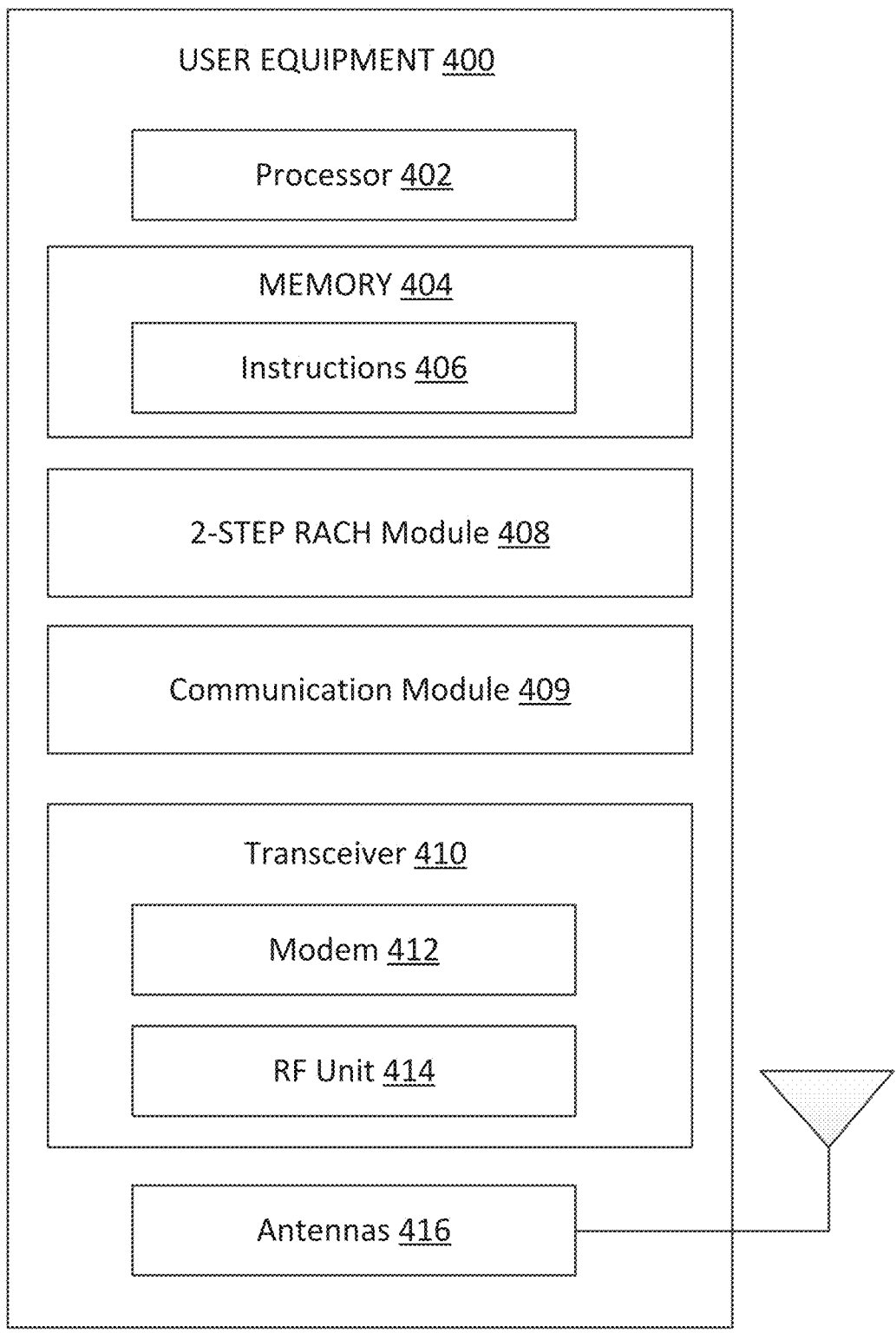
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or UE 202 shown in other figures, for example. As shown, the UE 400 may include a processor 402, a memory 404, a BWP hopping module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The 2-step RACH module 408 may communicate with the communication interface 409 to receive from or transmit messages to another device. Each of the 2-step RACH module 408 and the communication interface 409 may be implemented via hardware, software, or combinations thereof. For example, each of the 2-step RACH module 408 and the communication interface 409 may be implemented as a processor, circuit, and/or instructions 406 stored in the memory 404 and executed by the processor 402. In some examples, the 2-step RACH module 408 and the communication interface 409 can be integrated within the modem subsystem 412. For example, the 2-step RACH module 408 and the communication interface 409 can be implemented by a combination of software components (e.g., executed by a DSP or a general processor) and hardware components (e.g., logic gates and circuitry) within the modem subsystem 412. In some examples, a UE may include one of the 2-step RACH module 408 and the communication interface 409. In other examples, a UE may include both the 2-step RACH module 408 and the communication interface 409.

The 2-step RACH module 408 and the communication interface 409 may be used for various aspects of the present disclosure, for example, aspects of FIGS. 2-3 and 6-17. The 2-step RACH module 408 is configured to receive from a BS (e.g., 204) system information for initiating a RACH procedure. The 2-step RACH module 408 is further configured to transmit MsgA including a random access preamble and a payload containing a connection request to the BS. The 2-step RACH module 408 is further configured to monitor for MsgB from the BS in response to MsgA during a random access response (RAR) window. The 2-step RACH module 408 is further configured to re-transmit MsgA if no MsgB is received from the BS within the RAR window. Or the 2-step RACH module 408 is further configured to determine whether to re-transmit the connection request in a Msg 3 as a fallback to the standard 4-step RACH, or to transmit an acknowledgement message, based on a type of the payload decoded from a received MsgB, if a MsgB is received from the BS within the RAR window.

The communication interface 409 is configured to coordinate with the 2-step RACH module 408 to receive system information, MsgB and/or other DL scheduling grants from the BS, and/or communicate with the BS according to the UL and/or DL scheduling grants. The communication interface 409 is further configured to transmit MsgA, and/or other UL data to the BS.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the 2-step RACH module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the 2-step RACH module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
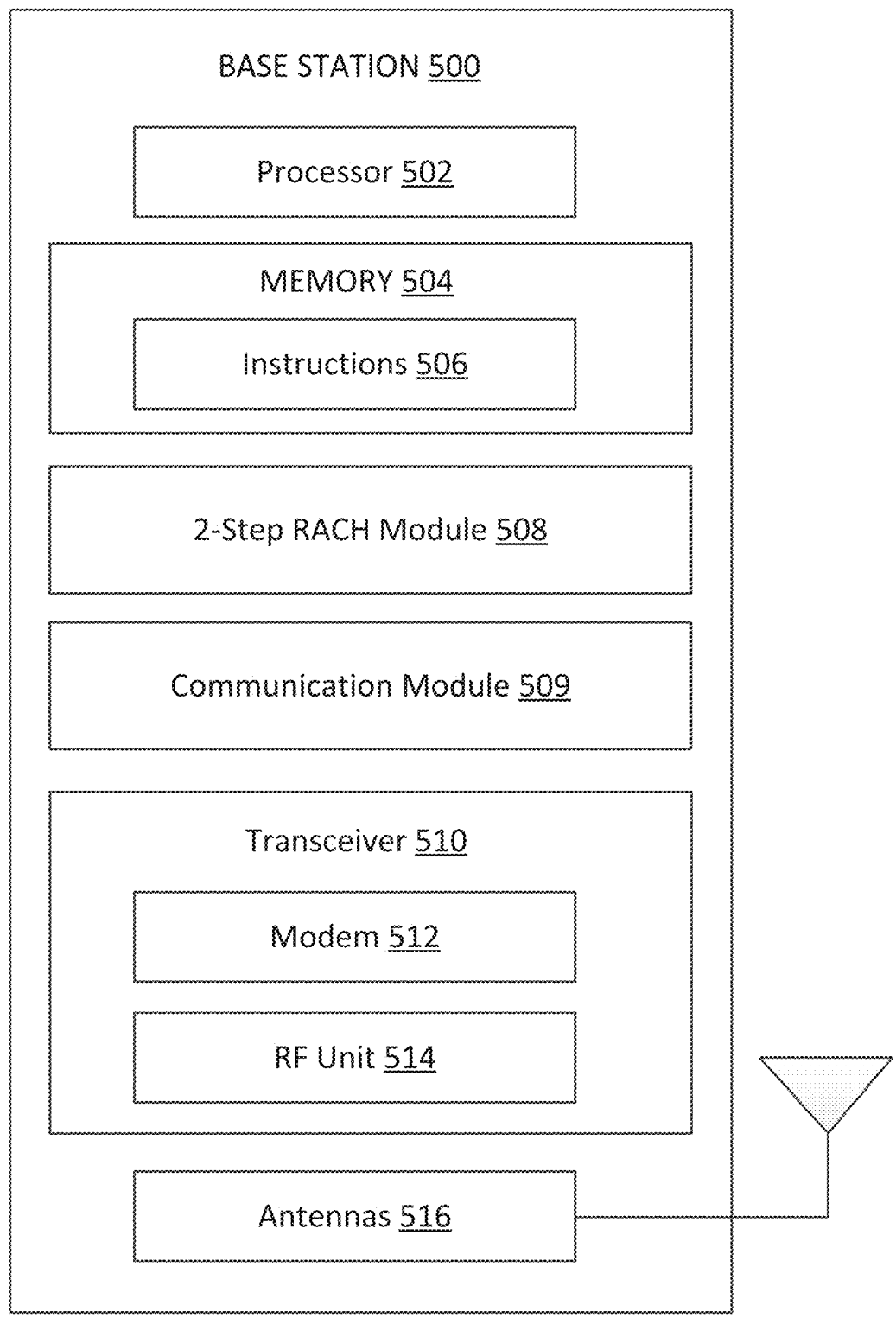
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a 2-step RACH module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The 2-step RACH module 408 may communicate with the communication interface 409 to receive from or transmit messages to another device. Each of the 2-step RACH module 508 and the communication interface 509 may be implemented via hardware, software, or combinations thereof. For example, each of the 2-step RACH module 508 and the communication interface 509 may be implemented as a processor, circuit, and/or instructions 506 stored in the memory 504 and executed by the processor 502. In some examples, the 2-step RACH module 508 and the communication interface 509 can be integrated within the modem subsystem 512. For example, the 2-step RACH module 508 and the communication interface 509 can be implemented by a combination of software components (e.g., executed by a DSP or a general processor) and hardware components (e.g., logic gates and circuitry) within the modem subsystem 512. In some examples, a UE may include one of the 2-step RACH module 508 and the communication interface 509. In other examples, a UE may include both the 2-step RACH module 508 and the communication interface 509.

The 2-step RACH module 508 and the communication interface 509 may be used for various aspects of the present disclosure, for example, aspects of FIGS. 3A-3C and 6A-10. The 2-step RACH module 508 is configured to broadcast system information for initiating a random access channel procedure. The 2-step RACH module 508 is further configured to receive MsgA including a random access preamble and a payload containing a connection request. The 2-step RACH module 508 is further configured to determine whether at least a portion of MsgA is decodable. In response to a decoding failure of MsgA, the 2-step RACH module 508 is further configured to refrain from transmitting any message to UE 202 within a RAR window. In response to a decoding success of at least the portion of the first message, the 2-step RACH module 508 is further configured to transmit a RAR message containing a payload that is determined based on a type of the portion of MsgA that is successfully decoded.

The communication interface 509 is configured to coordinate with the 2-step RACH module 508 to broadcast system information, or to transmit MsgB to the UE. The communication interface 509 is further configured to receive MsgA or other UL data from the UE.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the 2-step RACH module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6A:
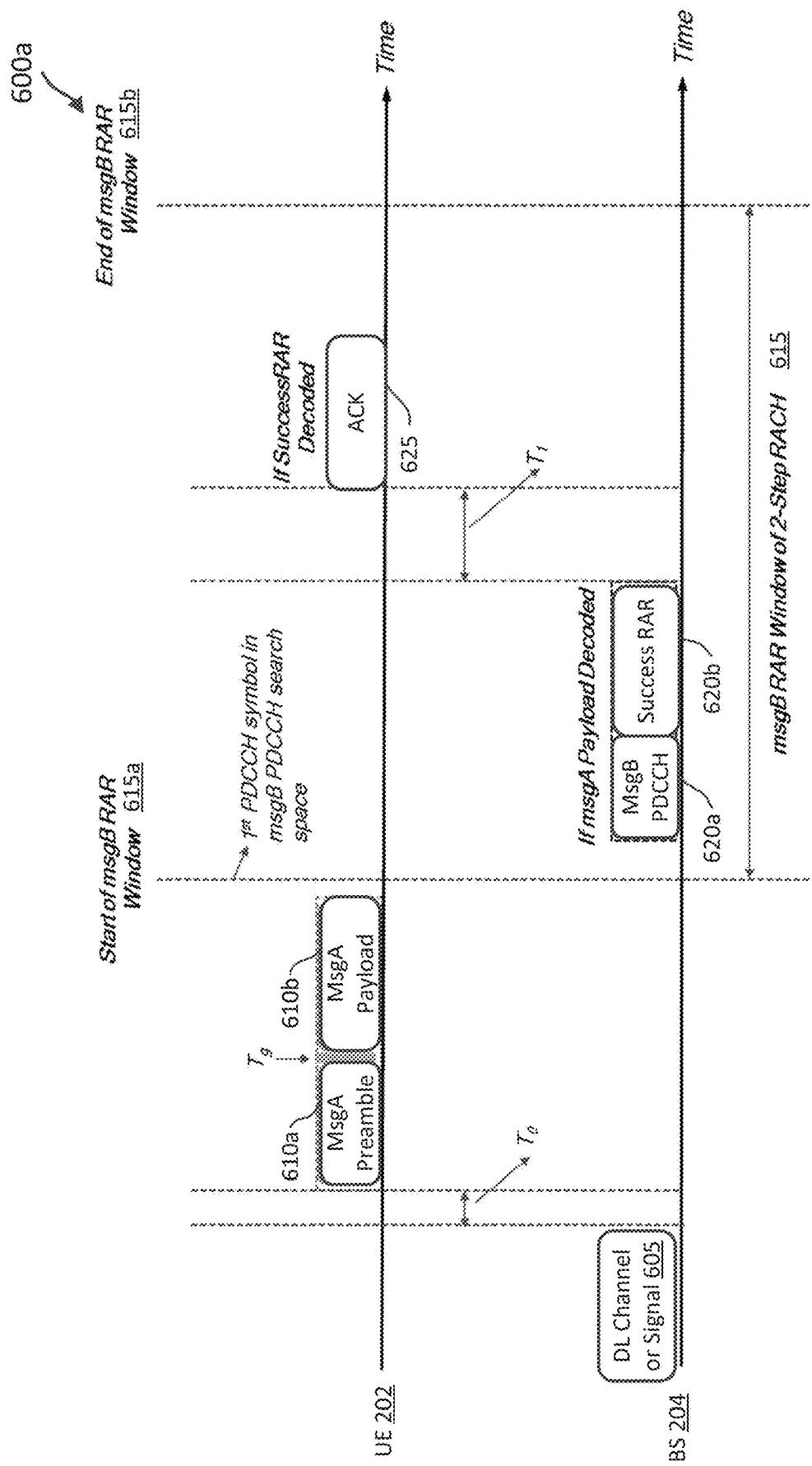
FIGS. 6A-6C illustrates retransmission timeline designs in different scenarios of a 2-step RACH procedure between the UE and the BS according to some aspects of the present disclosure.
Figure 6B:
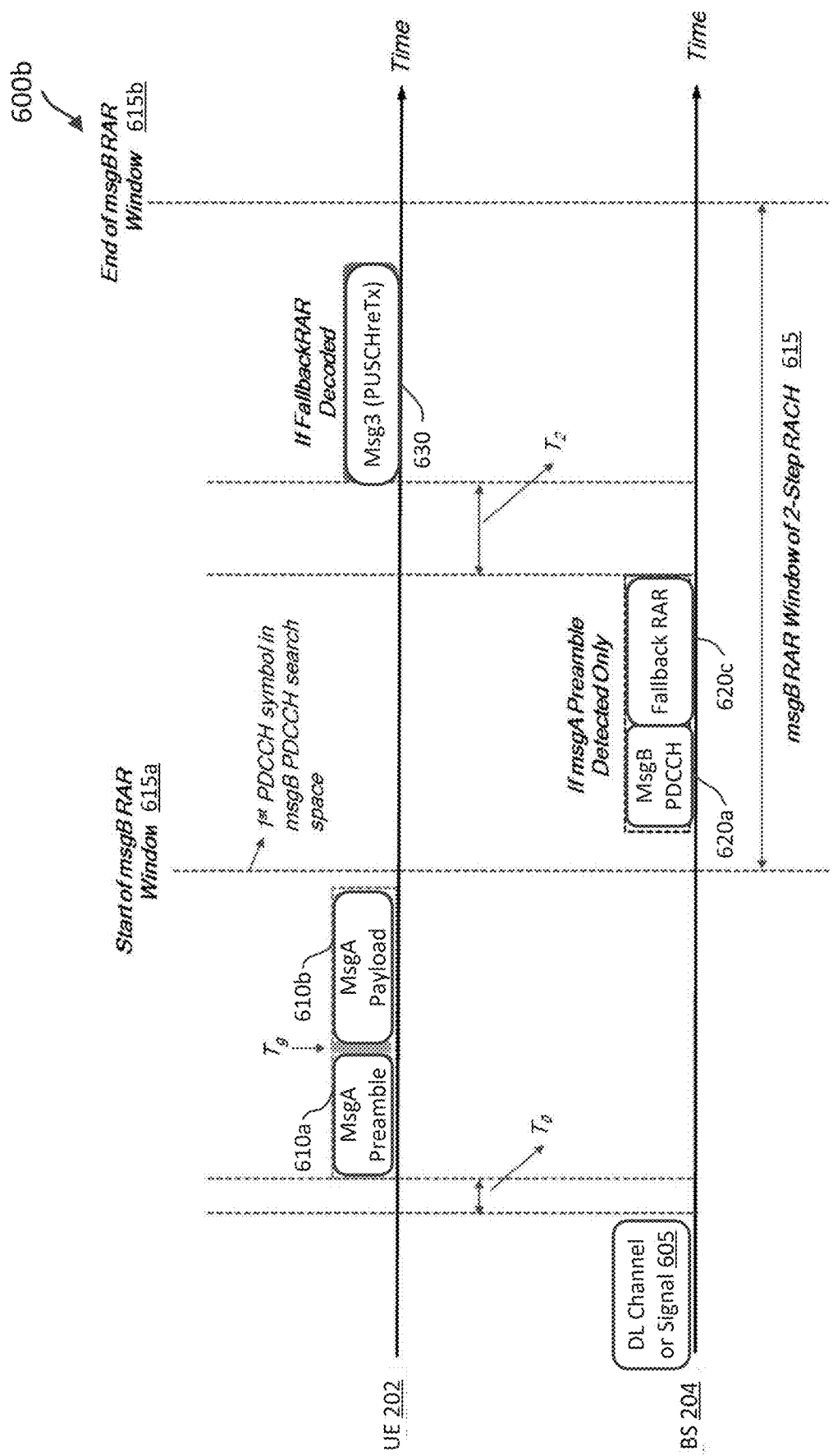
Figure 6C:
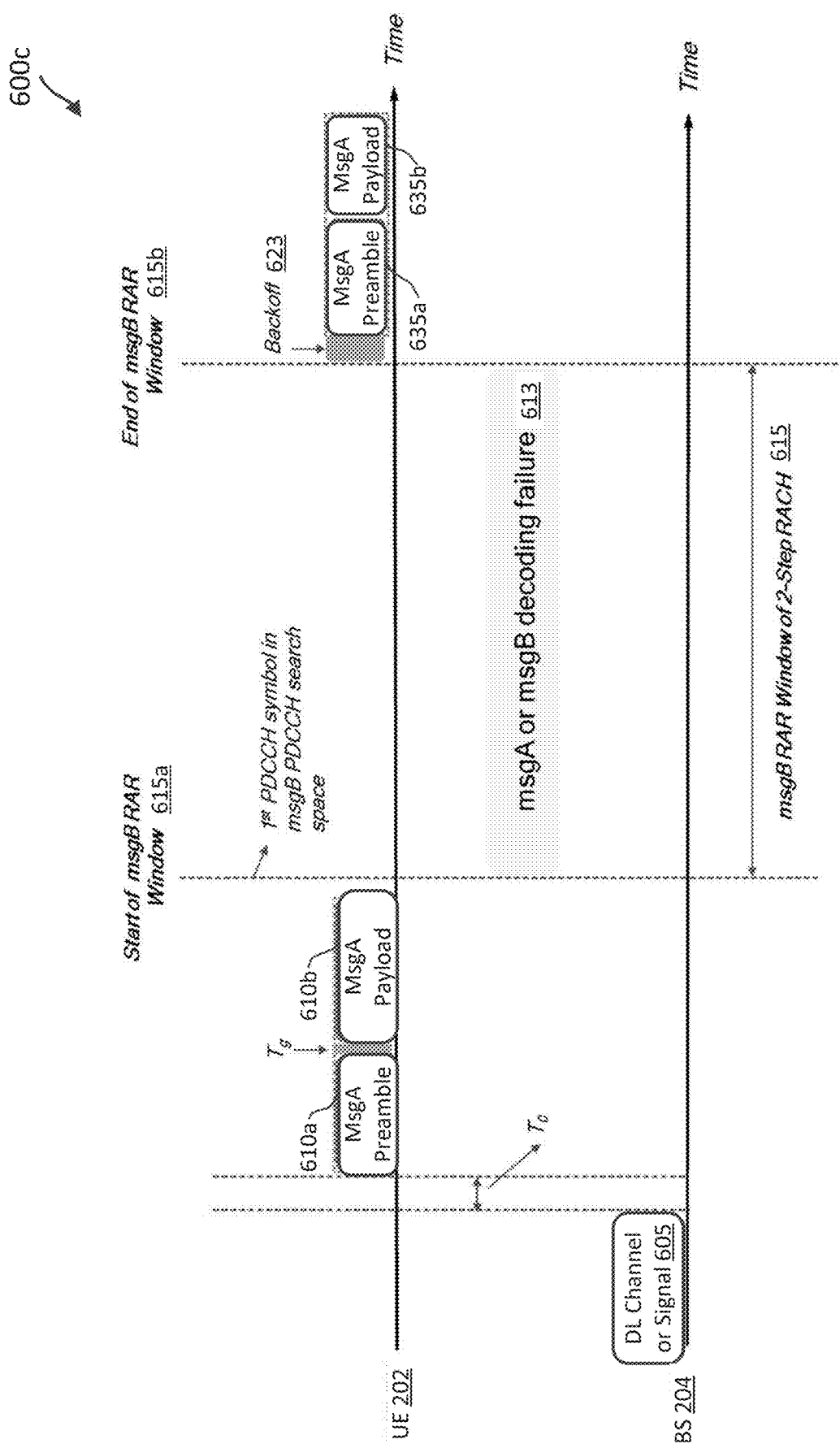

FIGS. 6A-6C illustrates retransmission timeline designs in different scenarios of a 2-step RACH procedure between the UE and the BS according to some aspects of the present disclosure. In FIGS. 6A-6C, the schemes 600a-c may be employed by a BS such as the BSs 105 in FIG. 1, BS 204 in FIG. 2, and/or 500 in FIG. 5, and a UE such as the UEs 115 in FIG. 1, UE 202 in FIG. 2 and/or 400 in FIG. 4 in a network such as the network 100 operating over a shared frequency band or an unlicensed frequency band. The UE 202 may be a low-cost UE device that operates over a narrowband of about 20 MHz or less. Additionally, in FIGS. 6A-6C, the horizontal axes represent time in some constant units.

Diagram 600a shows a scenario when the 2-step RACH procedure between UE 202 and BS 204 successfully establishes a connection. The BS 204 may broadcast downlink channel or signals 605 to multiple UEs in the communication range. For example, the downlink channel or signals 605 may include a system information block containing a root sequence identifier, cyclic shift, RA subframe, uplink grants, and/or the like. Upon a completion of receiving the downlink data 605, UE 202 may wait for a time gap of $T_0$ after the last downlink data symbol before transmitting MsgA (610a-b, which are also collectively referred to as 610) to BS 204.

In some aspects, the time gap $T_0$ facilitates the transition from downlink transmission to uplink transmission and may has a lower bound value. The $T_0$ lower bound may be pre-determined based on a variety of factors, including but not limited to the duplexing mode between the BS 202 and the UE 204 (e.g., time domain duplex or frequency domain duplex), the tuning time for numerology or the bandwidth part (BWP) switch between the last downlink data symbol and the first uplink data symbol of MsgA 610, the preparation time required by UE 202 to prepare MsgA payload 610b, the processing time required for the downlink channel that transmit the downlink channel information 610 from BS 204 to UE 202, and/or the like.

In some aspects, after the time gap $T_0$, UE 202 transmits the MsgA preamble 610a and MsgA payload 610b to BS 204. For example, the MsgA payload 610b may include a RRC connection request (e.g., the RA-RNTI, uplink data, initial device identity, etc.) with BS 204. To transmit the MsgA, UE 202 may wait for a time gap Tg between the transmission of the MsgA preamble 610a and the transmission of the MsgA payload 610b, which facilitates BS 204 to detect the beginning of the MsgA payload 610b. The time gap Tg is greater than a lower bound value, which can be pre-determined by a variety of factors, including but not limited to the physical random access channel (PRACH) format of MsgA 610, the time-domain resource allocation for MsgA 610, the time slot format, the tuning time for numerology switch between the MsgA preamble 610a and MsgA payload 610b, the listen-before-talk (LBT) mechanism between BS 204 and UE 202, the channel occupancy time between BS 204 and UE 202, the frequency band for the RACH procedure, and the physical uplink shared channel (PUSCH) mapping type for MsgA 610.

In some aspects, the timing parameters $T_0$ and Tg may be pre-stored in lookup tables. For example, the parameter values of $T_0$ and Tg may be empirically determined according to various combinations of factors described above, and stored at a lookup table. The UE 202 may retrieve a corresponding timing parameter $T_0$ and Tg from the pre-defined lookup table based on the factors of the system.

Upon completion of transmitting MsgA 610, UE 202 may start a timer for a RAR window to monitor for MsgB from BS 204. The starting point 615a of the RAR window 615 is aligned with the first PDCCH symbol in the PDCCH search space of MsgB. The determination of the starting point 615a of the RAR window 615 is further discussed in relation to FIG. 10. UE 202 runs the timer for a RAR window length until the end of the RAR window 615b. The length of the RAR window may be provided to UE 202 by BS 204, which is further described in relation to FIG. 9.

During the RAR window 615, BS 204 may receive and decode the MsgA 610, and prepare for MsgB (including the MsgB PDCCH 620a and MsgB payload 620b, which are collectively referred to as 620) while UE 202 may monitor for MsgB. If BS 204 successfully decodes and retrieves information from MsgA payload 610b, BS 205 may include a RAR response, denoted by "success RAR" 620b in the payload of the MsgB 620. The BS 204 then transmits MsgB 620 to the UE 202.

Upon receiving MsgB 620, UE 202 may decode MsgB 620. If the success RAR 620b is decoded from the payload of MsgB 620, UE 202 transmits an acknowledgement message 625 to BS 204 to notify that a RRC connection has been established. UE 202 may wait for a time gap $T_1$ after the last data symbol of PDSCH of MsgB 620 before transmitting the acknowledgement message 625. For example, the time gap $T_1$ provides processing time for UE 202 to decode the received MsgB 620, and TA-based uplink timing adjustment for UE 202. The time gap $T_1$ is also determined such that the acknowledgement message 625 is transmitted with the RAR window 615, but also greater than a lower bound value. The lower bound value for $T_1$ may be pre-determined based on various factors including, but not limited to the PDSCH processing time, the time slot format (whether TDD is used), whether the acknowledgement message 625 is piggybacked on PUSCH, and/or the like.

In some aspects, similar to the time gaps $T_0$ and Tg, $T_1$ may be retrieved from a pre-stored lookup table listing empirically determined values for $T_1$ corresponding to various combination of factors. In some aspects, the time gap $T_1$ may be dynamically determined depending on the RAR window 615 such that sufficient time is left for the acknowledgement message 625 before the end of the RAR window 615b.

Diagram 600b shows a scenario when the 2-step RACH procedure between UE 202 and BS 204 falls back to the traditional 4-step RACH procedure due to decoding failure of MsgA payload 610b. Similar to diagram 600a, BS 204 broadcasts downlink channel or signals 605 to multiple UEs in the communication range, followed by UE 202 transmitting MsgA 610 to BS 204. The UE 202 may start a timer for a RAR window to monitor for MsgB from BS 204.

Unlike diagram 600a, in diagram 600b, if BS 204 fails to decode MsgA payload 610b, e.g., the received MsgA 610 is corrupted due to channel fading or collision and only MsgA preamble 610a can be detected from the received message, BS 204 is unable to respond with a connection setup as the connection request from MsgA payload 610b is missing. In this case, BS 204 may include a fallback indication, denoted by "fallback RAR" 620c in the payload of the MsgB 620, and transmit MsgB 620 to UE 202 to indicate that the RRC connection setup is unsuccessful and the 2-step RACH is to fall back to the 4-step way.

Upon receiving MsgB 620 from BS 204, UE 202 decodes the received MsgB 620. If the Fallback RAR 620c is decoded from the payload of MsgB 620, UE 202 transmits a Msg3 630 over PUSCH to notify BS 204 that the RACH procedure is to fall back to 4-step RACH. In some aspects, the Msg3 630 can be a retransmitted version of MsgA payload 610b that was not successfully decoded at BS 204. In some aspects, Msg3 630 may be different from MsgA payload 610b, e.g., to initiate a new RRC connection request. When Msg3 630 has a different length than MsgA payload 610b, UE 202 may add padding bits or truncate Msg3 to ensure the transmission of Msg3 can be completed by the end of the RAR window 615b.

UE 202 may wait for a time gap $T_2$ after the last data symbol of MsgB 620 before re-transmitting MsgA payload 610b. For example, the time gap $T_2$ provides processing time for UE 202 to decode the received MsgB 620, and TA-based uplink timing adjustment for UE 202. The time gap $T_2$ is also determined such that sufficient time is left in the RAR window 615 for transmitting Msg3 630, but also greater than a lower bound value. The lower bound value for $T_1$ may be pre-determined based on various factors including, but not limited to the PDSCH processing time, the time slot format, the PUSCH preparation time, and/or the like.

In some aspects, similar to the time gaps $T_0$ and Tg, $T_2$ may be retrieved from a pre-stored lookup table listing empirically determined values for $T_2$ corresponding to various combination of factors. In some aspects, the time gap $T_2$ may be dynamically determined depending on the RAR window 615 such that sufficient time is left for Msg3 630 before the end of the RAR window 615b. In some aspects, the time gap $T_2$ can be shorter than the time gap $T_1$ as Msg3 630 may requires more transmission time than the acknowledgement message 625.

Diagram 600c shows a scenario when the 2-step RACH procedure between UE 202 and BS 204 calls for a complete retransmission of MsgA when BS 204 fails to decode or receive MsgA at all. Similar to diagrams 600a-b, BS 204 broadcasts downlink channel or signals 605 to multiple UEs in the communication range, followed by UE 202 transmitting MsgA 610 to BS 204. The UE 202 may start a timer for a RAR window to monitor for MsgB from BS 204.

Unlike diagrams 600a-b, in diagram 600c, BS 204 may not receive any message from UE 202 due to channel corruption, or receive a corrupted MsgA 610 which is largely undecodable. If BS 204 fails to detect any of MsgA preamble 610a or MsgA payload 610b due to decoding failure at 613 during the RAR window 615, BS 204 may not act and does not transmit anything during the RAR window 615. In the meantime, UE 202 may monitor but receive nothing from BS 204 during the RAR window 615.

In this case, when UE 202 receives no MsgB 620 from BS 204 during the RAR window 615, UE 202 may call for a retransmission of MsgA 610. After a back off and MAC protocol processing at 623, UE 202 may retransmit MsgA containing the MsgA preamble 635a and MsgA payload 635b. In some aspects, the MsgA preamble 635a and MsgA payload 635b may be the same as the MsgA preamble 610a and MsgA payload 610b, respectively. In some aspects, UE 202 may re-select MsgA preamble 635a or a PUSCH occasion in time or frequency domain, or a demodulation reference signal source for the retransmission. In some aspects, UE 202 may re-construct MsgA payload 635b with a different content, different modulation and coding scheme (MCS), different transport block size (TBS), etc. from MsgA payload 610b for the re-transmitted MsgA. In some aspects, the retransmitted MsgA preamble 635a or MsgA payload 635b may be configured with power ramping or transmitter beam switching.

As shown in FIGS. 6A-6C, UE 202 does not always transmit a HARQ feedback signal for MsgB, e.g., the acknowledgement message or a non-acknowledgement message to BS 204 to notify whether the RRC connection has been successfully established. As shown at diagram 600b, if UE 202 successfully decodes a FallbackRAR 620b from MsgB 620, UE 202 does not transmit "ACK" or "NACK" to BS 204. As shown at diagram 600c, If UE 202 does not receive SuccessRAR 620b or FallbackRAR 620c, UE 202 does not transmit any "ACK" or "NACK" to BS 204 either.

As shown at diagram 600a, UE 202 transmits an "ACK" to BS 204, only if UE 202 can decode SuccessRAR 620b from MsgB 620. Before UE 202 transmits the acknowledgement message 625, UE 202 may apply "timing advance" to adjust the timing offset on uplink. For example, a medium access control (MAC) control element for a timing advance command may be included in the successRAR 620b.

In some aspects, the acknowledgement message 625 may be transmitted over PUCCH, the uplink control information (UCI) piggybacked on PUSCH, or an uplink reference signal. In some aspects, UE 202 may configure a resource allocation indicator for the acknowledgement message 625 at a MAC control element, a MAC sub-header, an index of sub-protocol data unit (PDU) corresponding to payload 620b. Or UE 202 may configure a resource allocation indicator for the acknowledgement message 625 at a sub-field of downlink control information (DCI), or the resource mapping pattern of CCE on PDCCH. Or UE 202 may configure a resource allocation indicator for the acknowledgement message 625 with a joint indication by MsgB PDCCH and MsgB PDSCH. Or UE 202 may configure a resource allocation indicator for the acknowledgement message 625 via RRC and the preamble resource index.

Figure 7A:
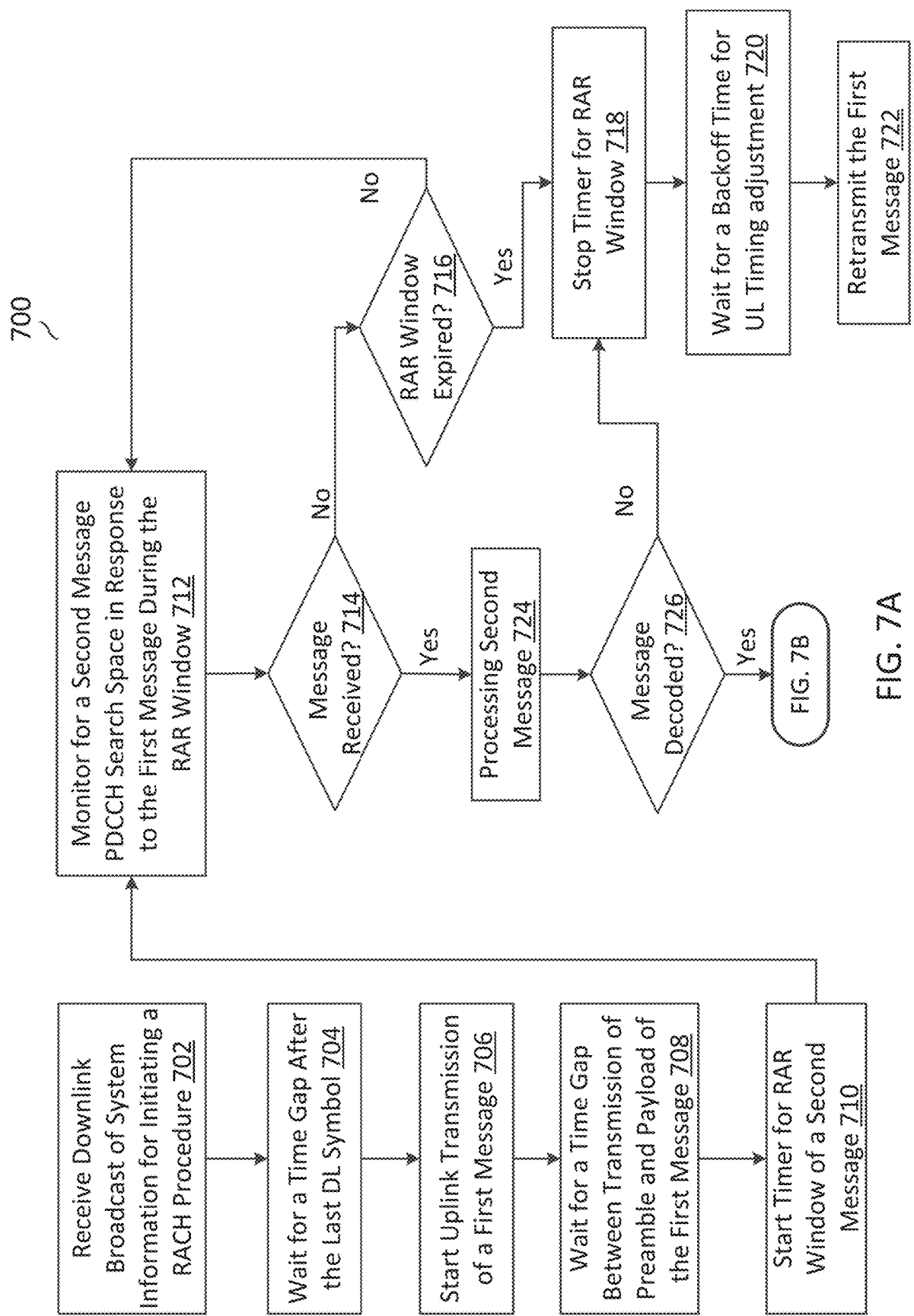
FIGS. 7A-7B illustrates a logic flow performed by the UE corresponding to the retransmission timeline designs in different scenarios of the 2-step RACH procedure shown in FIGS. 6A-6B according to some aspects of the present disclosure.
Figure 7B:
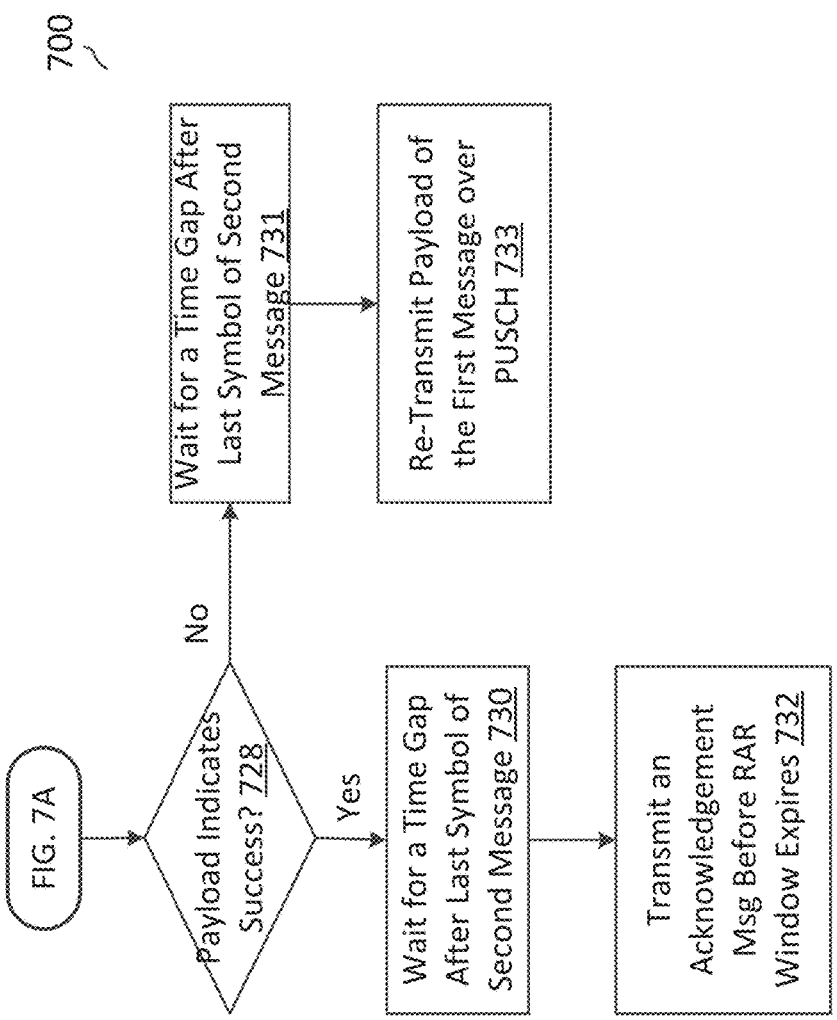

FIGS. 7A-7B illustrates a logic flow performed by the UE corresponding to the retransmission timeline designs in different scenarios of the 2-step RACH procedure shown in FIGS. 6A-6C according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the 2-step RACH module 408, the communication interface 409, the transceiver 410, the modem 412, and the one or more antennas 416, to execute the steps of method 700. The method 700 may employ in conjunction with diagrams 600a-c described above with respect to FIGS. 6A-6C. As illustrated, the method 700 includes a number of enumerated steps, but aspects of the method 700 include additional steps before, after, and in between the enumerated steps. In some aspects, one or more of the enumerated steps may be omitted or performed in a different order.

At step 702, UE 202 receives, e.g., from BS 204, system information or RRC signaling for configuring a RACH procedure. For example, the system information or RRC signaling may be transmitted via the downlink channel or signaling 605 shown in FIGS. 6A-6C.

At step 704, UE 202 waits for a time gap after the last downlink symbol (e.g., the last symbol of the system information, control or reference signal) from the BS before transmitting the first message to the BS. For example, as shown in FIG. 6A, UE 202 waits for a time period of $T_0$ before transmitting the MsgA preamble 610a. In some embodiments, the value of $T_0$ may be pre-determined based on a variety of factors, including but not limited to the duplexing mode between the BS 202 and the UE 204 (e.g., time domain duplex or frequency domain duplex), the tuning time for numerology or a bandwidth part (BWP) switch between the last symbol and a first uplink symbol random access preamble of the first message of MsgA 610, the preparation time required by UE 202 to prepare MsgA payload 610b, the processing latency for a medium access control (MAC) protocol, the processing time required for the downlink channel that transmit the downlink channel information 610 from BS 204 to UE 202, and/or the like.

At step 706, UE 204 starts uplink transmission of the first message, e.g., MsgA 610 in FIG. 6A, to the BS. Specifically, at step 708, UE 202 waits for a time gap of Tg (as shown in FIG. 6A) between the transmission of MsgA preamble (e.g., 610a in FIG. 6A) and the transmission of MsgA payload (e.g., 610b in FIG. 6A). In some embodiments, the value of Tg is greater than a lower bound value, which can be pre-determined by a variety of factors, including but not limited to the preamble format of the PRACH format, the time-domain resource allocation for MsgA preamble 610a, the slot format used in a time division duplexing (TDD) mode, the tuning time for numerology switch between the MsgA preamble 610a and the PUSCH carrying the MsgA payload 610b, the LBT mechanism between BS 204 and UE 202 when the RACH procedure is operating on a shared or unlicensed frequency spectrum, the channel occupancy time for UE 202 when the RACH procedure is operating on a shared or unlicensed frequency spectrum, the frequency band for the RACH procedure, and the PUSCH mapping type for MsgA payload 610b.

At step 710, UE 202 starts a timer for MsgB RAR window (e.g., 615 in FIG. 6A). For example, the starting point of the MsgB RAR window is determined by method 1000 in FIG. 10.

At step 712, UE 202 monitors for a second message in response to the first message, during the RAR window. For example, UE 202 may search for MsgB (e.g., 620 in FIG. 6A) in MsgB PDCCH search space in response to MsgA during the RAR window.

At step 714, UE 202 determines whether a second message (e.g., MsgB 620) is received. If no MsgB is received, method 700 proceeds to step 716, at which UE 202 determines whether the RAR window has expired. If the RAR window is not expired yet, method 700 proceeds to step 712 for UE 202 to continue monitoring for MsgB.

If the RAR window has expired at step 716, UE 202 stops the timer for the MsgB RAR window at step 718. At step 720, UE 202 waits for a back-off time for uplink timing adjustment, and then at step 722, UE 202 retransmits the first message. For example, UE 202 may retransmit MsgA, e.g., see 635a-b in FIG. 6C. In some embodiments, UE 202 may re-construct the message payload for the retransmitted MsgA. Back at step 714, if UE 202 determines a second message has been received (e.g., MsgB 620), method 700 proceeds to step 724, at which UE 202 processes and decodes MsgB. At step 726, UE 202 determines whether and which portion of MsgB can be decoded. If the preamble of MsgB cannot be decoded at all, method 700 proceeds to step 718. For example, if only a back-off indicator (BI) but no payload is decoded from MsgB at step 726, the UE 202 performs a back off according to a back-off indicator decoded from MsgB, and aa processing latency of MAC protocol after the RAR window has lapsed at step 720. UE 202 then retransmits MsgA at step 722.

In some embodiments, UE 202 re-selects a random access preamble resource or a PUSCH resource in code, space, time or frequency domain for the re-transmission of MsgA at step 722.

In some embodiments, UE 202 re-constructs a payload for the re-transmitted MsgA with a different content from MsgA payload 610b, and applies power ramping for the retransmission of MsgA.

If at least a portion of MsgB (e.g., MsgB preamble 620a or payload 620b) is decoded, method 700 proceeds to step 728, at which UE 202 determines what type of the MsgB payload can be decoded from MsgB, e.g., whether a SuccessRAR 620b or Fallback RAR 620c. If the decoded MsgB payload indicates that the MsgA payload was successfully decoded at BS 204, e.g., a successRAR 620b is decoded, method 700 proceeds to step 730, at which UE 202 waits for a time gap T1 (e.g., shown in FIG. 6A) after the last symbol of MsgB before any uplink transmission. For example, the time gap $T_1$ provides processing time for UE 202 to decode the received MsgB 620, and TA-based uplink timing adjustment for UE 202. The time gap $T_1$ is also determined such that the acknowledgement message 625 is transmitted with the RAR window 615, but also greater than a lower bound value. The lower bound value for $T_1$ may be pre-determined based on various factors including, but not limited to the PDSCH processing time, the time slot format (whether TDD is used), a MAC protocol processing latency, whether the acknowledgement message 625 is piggybacked on PUSCH, and/or the like.

In some embodiments, after decoding a success RAR at step 728, UE 202 decodes a resource allocation configured by the network for preparing an acknowledgement message by UE in response to the SuccessRAR.

At step 732, UE 202 transmits an acknowledgement message (e.g., 625 in FIG. 6A) indicative of a successful completion of the random access procedure before the RAR window expires. For example, the acknowledgement message may be transmitted over PUCCH, UCI piggybacked on PUSCH, or uplink reference signals.

In some embodiments, UE 202 applies a timing advance command to adjust a timing offset on an uplink from the UE to the BS before transmitting the acknowledgement message. The timing advance command is included in a random access response from the MsgB payload.

Back at step 728, if UE 202 determines that the type of payload decoded from MsgB a decoding failure of MsgA payload at the BS, e.g., a Fallback RAR 620c is decoded, method 700 proceeds to step 731, at which UE 202 waits for a time gap 72 (e.g., shown in FIG. 6A) after the last symbol of MsgB before any uplink transmission. For example, the value of $T_2$ is determined such that sufficient time is left in the RAR window 615 for transmitting Msg3 630, which may be pre-determined based on various factors including, but not limited to the PDSCH processing time, the MAC protocol processing latency, the time slot format of TDD, the PUSCH preparation time, and/or the like. At step 733, UE 202 re-transmits MsgA payload in Msg3 (e.g., 630 in FIG. 6B) on PUSCH based on an uplink grant included in the FallbackRAR.

Figure 8:
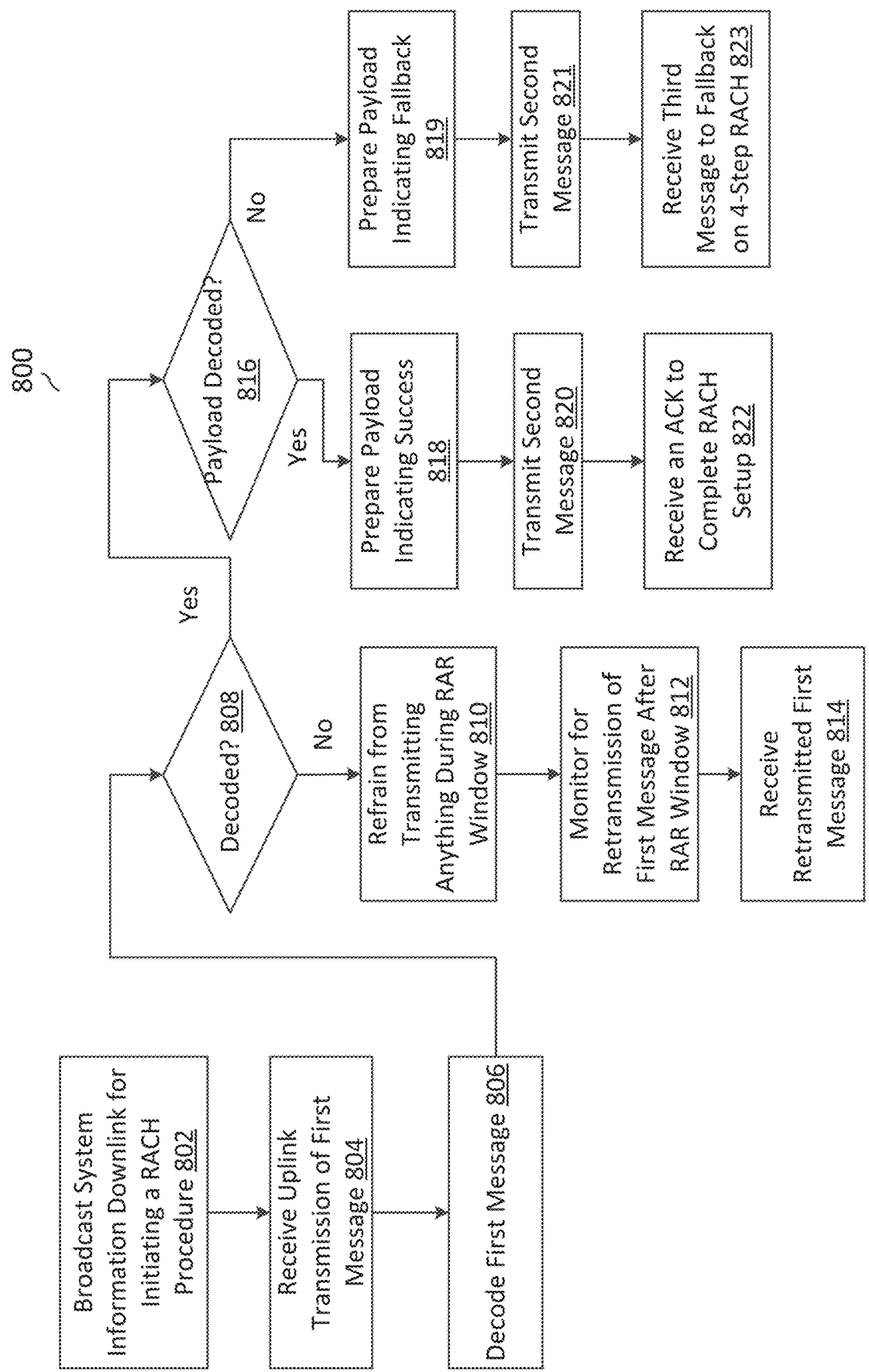
FIG. 8 illustrates a logic flow performed by the BS corresponding to the retransmission timeline designs in different scenarios of the 2-step RACH procedure shown in FIGS. 6A-6B according to some aspects of the present disclosure.

FIG. 8 illustrates a logic flow performed by the BS corresponding to the retransmission timeline designs in different scenarios of the 2-step RACH procedure shown in FIGS. 6A-6C according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the BS 105, BS 204 or BS 500, may utilize one or more components, such as the processor 502, the memory 504, the 2-step RACH module 508, the communication interface 509, the transceiver 510, the modem 512, and the one or more antennas 516, to execute the steps of method 800. The method 800 may employ in conjunction with diagrams 600a-c described above with respect to FIGS. 6A-6C. As illustrated, the method 800 includes a number of enumerated steps, but aspects of the method 800 include additional steps before, after, and in between the enumerated steps. In some aspects, one or more of the enumerated steps may be omitted or performed in a different order.

At step 802, BS 204 transmits system information and RRC signaling downlink to multiple UE(s). For example, the system information and RRC signaling may be communicated via downlink channel or signals 605 shown in FIG. 6A.

At step 804, BS 204 receives uplink transmission of the first message. For example, BS 204 receives MsgA from UE 202 (e.g., 610 in FIG. 6A).

At step 806, BS 204 decodes the received first message. For example, BS 204 processes and decodes MsgA during the RAR window 615 as shown in FIG. 6A.

At step 808, BS 204 determines whether the first message can be decoded. If the first message cannot be decoded, method 800 proceeds to step 810, at which BS 204 refrain from transmitting anything downlink during the RAR window. For example, if the MsgA preamble fails to be decoded from MsgA at step 808, BS 204 transmits a back off indicator to UE 202.

At step 812, BS 204 monitors for MsgA retransmission after the RAR window has expired.

At step 814, BS 204 receives a retransmitted first message. For example, the retransmitted message (e.g., 635a-b in FIG. 6C) may have the same MsgA payload 610b, or may have a re-constructed payload (e.g., with a new connection request).

Back at step 808, if BS 204 determines that at least a portion of the first message can be decoded, e.g., the MsgA payload (e.g., 610b in FIG. 6A) can be decoded, method 800 proceeds to step 818, at which BS 204 decode MsgA payload to obtain a unique identifier of UE 202, and prepares a second message with a payload to indicate decoding success. For example, BS 204 prepares MsgB with a payload of SuccessRAR (e.g., 620b in FIG. 6A) to indicate connection success. BS 204 further prepares MsgB with a PDCCH and a PDSCH, and configures scheduling information for the PSDCH for MsgB. For another example, BS 204 further prepares MsgB by scrambling a cyclic redundancy check of the PDCCH by a cell-radio-network-temporary-identifier (C-RNTI) or a group RNT, and mapping the payload of MsgB to the PDSCH. The MsgB payload includes at least a back off indicator (BI).

In some embodiments, BS 204 detects MsgA preamble from MsgA to obtain a timing advance of UE 202, and then prepares MsgB including a timing advance command, the unique identifier of the UE 202 and a resource allocation for the UE in MsgB.

At step 820, BS 204 transmits the second message, e.g., MsgB with SuccessRAR 620b to the UE. At step 822, BS 204 receives an acknowledgement message (e.g., 625 in FIG. 6A) from the UE indicative of a successful completion of the random access procedure.

Back at step 808, if BS 204 determines that only the preamble of the first message (e.g., MsgA preamble 610a in FIG. 6B) can be decoded, method 800 proceeds to step 819, at which BS 204 prepares the second message with a payload to indicate decoding failure. For example, BS 204 prepares MsgB with a payload of FallbackRAR (e.g., 620c in FIG. 6B) to indicate a decoding failure of MsgA payload, and thus fallback to the 4-step RACH is needed.

In some embodiments, BS 204 includes in MsgB a timing advance command, an index of a random access preamble sequence (RAPID) and an uplink grant for the UE 202 to retransmit MsgA payload.

At step 821, BS 204 transmits the second message, e.g., the MsgB with MsgB Fallback RAR (e.g., 620b in FIG. 6B). At step 823, BS 204 receives a third message notifying that the UE is to fall back on the 4-step RACH. For example, the MsgA payload may be retransmitted to BS 204, in the form of Msg3 of the 4-step RACH. In this way, BS 204 is notified that a 4-step RACH is being implemented upon receipt of Msg3.

Figure 9:
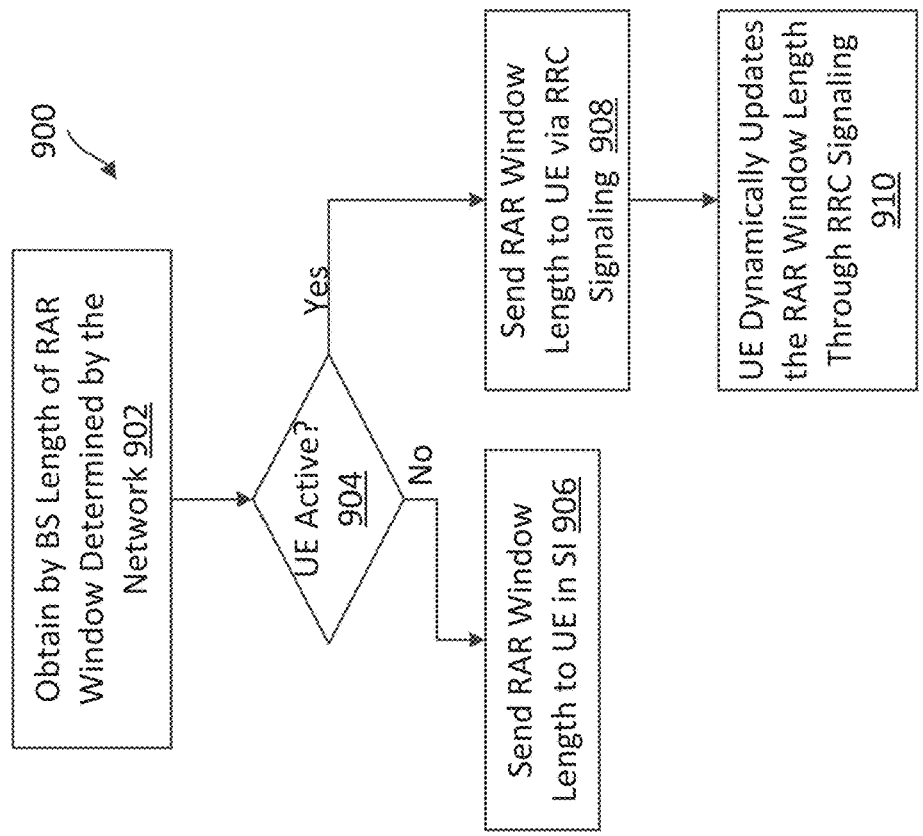
FIG. 9 illustrates a logic flow of configuring a random access response (RAR) window length in the 2-step RACH procedure according to some aspects of the present disclosure.

FIG. 9 illustrates a logic flow of configuring a random access response (RAR) window length in the 2-step RACH procedure according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the BS 105, BS 204 or BS 500, may utilize one or more components, such as the processor 502, the memory 504, the 2-step RACH module 508, the communication interface 509, the transceiver 510, the modem 512, and the one or more antennas 516, to execute the steps of method 800. The method 900 may employ in conjunction with diagrams 600a-c described above with respect to FIGS. 6A-6C. As illustrated, the method 900 includes a number of enumerated steps, but aspects of the method 900 include additional steps before, after, and in between the enumerated steps. In some aspects, one or more of the enumerated steps may be omitted or performed in a different order.

At step 902, BS 204 obtains the length of MsgB RAR window, which can be pre-determined by the network. In some embodiments, the RAR window length may be determined based on factors such as, but not limited to MsgA priority, the density for MsgA preamble/payload resource allocation, synchronization-signal-block (SSB) to occasion association periodicity, the UE capability, and/or the like. For example, the RAR window length may be inversely proportional to the MsgA priority level, e.g., a shorter window length may be assigned to a MsgA with higher priority. For another example, when resource allocation for MsgA decreases, the RAR window length may be increased.

At step 904, BS 204 determines whether any UE is in a RRC connected state. If UE 202 is not RRC connected, e.g., in an idle state, BS 204 may send the RAR window length to the UE in system information broadcasts at step 906. If UE 202 is RRC connected at step 904, BS 204 sends the RAR window length to UE 202 via RRC signaling at step 908. At step 910, UE 202 may dynamically update the RAR window length from BS 204 via RRC signaling.

Figure 10:
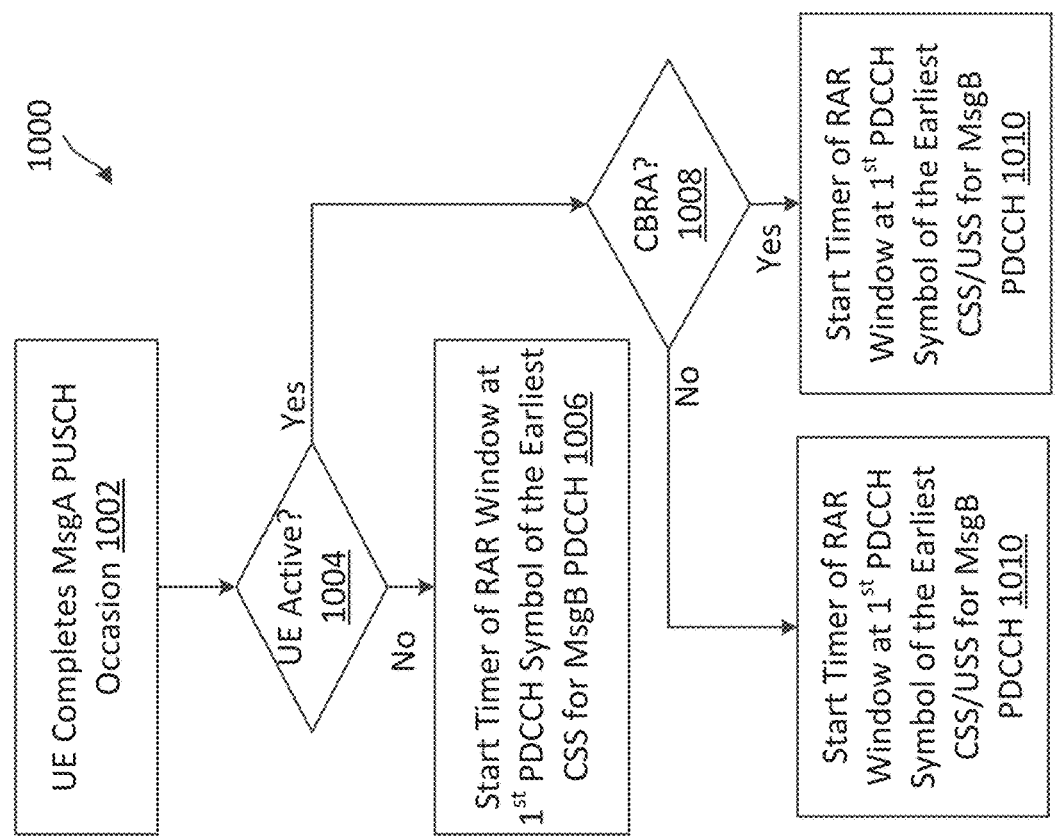
FIG. 10 illustrates a logic flow of configuring a starting point of the random access response (RAR) window in the 2-step RACH procedure according to some aspects of the present disclosure.

FIG. 10 illustrates a logic flow of configuring a starting point of the random access response (RAR) window in the 2-step RACH procedure according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the 2-step RACH module 408, the communication interface 409, the transceiver 410, the modem 412, and the one or more antennas 416, to execute the steps of method 1000. The method 1000 may employ in conjunction with diagrams 600*a-c* described above with respect to FIGS. 6A-6C. As illustrated, the method 1000 includes a number of enumerated steps, but aspects of the method 700 include additional steps before, after, and in between the enumerated steps. In some aspects, one or more of the enumerated steps may be omitted or performed in a different order.

At step 1002, UE 202 completes a PUSCH occasion. At step 1004, UE 202 determines whether the UE is in a RRC connected state, e.g., connected to a BS. If UE 202 is not RRC connected, e.g., in an idling state, method 1000 proceeds to step 1006, at which UE 202 starts a timer for RAR window at the 1$^{st}$ PDCCH symbol of the earliest common search space (CSS) for MsgB PDCCH. In this case, UE 202 searches the first PDCCH symbol of MsgB within the CSS configured by the system information.

Otherwise, if UE 202 is RRC connected, UE 202 further determines whether the random access is contention based (CBRA) or contention free (CFRA) at step 1008. Under the CBRA scheme at step 1008, UE 202 starts the timer for MsgB RAR window at the 1$^{st}$ PDCCH symbol of the earliest CSS or UE-specific search space (USS) for MsgB PDCCH at step 1010. In this case, UE 202 searches for the first PDCCH symbol of MsgB within CSS configured by system information or within USS configured by RRC signaling.

Otherwise, under the CFBA scheme at step 1008, method proceeds to step 1012, at which UE 202 starts the timer for MsgB RAR window at the 1$^{st}$ PDCCH symbol of the earliest USS for MsgB PDCCH. In this case, the search space for MsgB PDCCH is USS only.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
  receiving, by a user equipment (UE) from a base station (BS), system information for initiating a random access channel (RACH) procedure;
  transmitting, by the UE to the BS, a first message including a random access preamble and a first payload of a connection request;
  monitoring, by the UE from the BS, for a second message in response to the first message during a random access response (RAR) window;
  re-transmitting, by the UE to the BS, the first message in response to determining based on the monitoring that no second message is received by the UE from the BS within the RAR window;
  re-transmitting, by the UE, the first payload to the BS in response to determining that the second message is received by the UE from the BS within the RAR window, and that a second payload decoded from the second message indicates a fallback response; and
  transmitting, by the UE, an acknowledgement message to the BS in response to determining that the second message is received by the UE from the BS within the RAR window and that the second payload indicates a success response.

2. The method of claim 1, further comprising:
  waiting, by the UE, for a time gap after receiving a last data symbol of the system information from the BS before transmitting the first message to the BS,
    wherein the time gap is determined by at least one of:
    a duplexing mode between the BS and the UE;
    a tuning time for numerology or a bandwidth part (BWP) switch between the last data symbol and a first data symbol of the first message;
    a preparation time for the first payload; or
    a processing time for a downlink channel that transmits the system information from the BS to the UE.

3. The method of claim 1, further comprising:
waiting, by the UE, for a time gap between transmission of the random access preamble and transmission of the first payload,
wherein the time gap is determined by at least one of:
a physical random access channel (PRACH) format;
a time-domain resource allocation;
a time slot format;
a tuning time for numerology switch between the random access preamble and the first payload;
a listen-before-talk mechanism between the BS and the UE;
a channel occupancy time between the BS and the UE;
a frequency band for the RACH procedure; or
a physical uplink shared channel (PUSCH) mapping type for the first message.

4. The method of claim 1, wherein the determining, by the UE, includes:
determining, by the UE, to re-transmit the connection request to the BS in response to determining that the second message is received by the UE from the BS within the RAR window but no payload is decoded from the second message; and
further comprising:
re-transmitting, by the UE to the BS, the first message after the RAR window has lapsed.

5. The method of claim 4, further comprising:
re-selecting, by the UE, the random access preamble or a PUSCH occasion used for the random access preamble in time or frequency domain for the re-transmitted first message.

6. The method of claim 4, further comprising:
re-constructing a payload for the re-transmitted first message with a different content from the first payload.

7. The method of claim 1, wherein the determining, by the UE, further comprises:
determining that the second message is received by the UE from the BS within the RAR window, and
further comprising:
decoding the second payload from the second message;
in response to determining that the decoded second payload indicates the first payload was successfully decoded at the BS, transmitting, by the UE to the BS, an acknowledgement message indicative of a connection setup in response to the connection request within the RAR window.

8. The method of claim 7, further comprising:
waiting for a time gap after a last data symbol of the second message before transmitting the acknowledgement message,
wherein the time gap is determined by at least one of:
a physical downlink shared channel (PDSCH) processing time;
a time slot format; or
whether the acknowledgement message is piggybacked on PUSCH.

9. The method of claim 7, further comprising:
applying, by the UE, a timing advance offset to adjust a timing offset on an uplink from the UE to the BS before transmitting the acknowledgement message.

10. The method of claim 7, wherein the acknowledgement is transmitted via:
a physical uplink control channel (PUCCH);
uplink control information (UCI) piggybacked on PUSCH; or
an uplink reference signal.

11. A method of wireless communication, comprising:
broadcasting, by a base station (BS) to a user equipment (UE), system information for initiating a random access channel procedure;
receiving, by the BS from the UE, a first message including a random access preamble and a first payload of a connection request; and
determining, by the BS, whether at least a portion of the first message is decodable;
refraining from transmitting any message to the UE within a random access response (RAR) window in response to a decoding failure of the first message; and
transmitting, by the BS to the UE, a RAR message containing a second payload indicating a fallback response or a success response that is determined based on a type of the portion of the first message in response to a decoding success of at least the portion of the first message.

12. The method of claim 11, wherein the first message is received after a time gap after a last data symbol of the system information,
wherein the time gap is determined by at least one of:
a duplexing mode between the BS and the UE;
a tuning time for numerology or a bandwidth part (BWP) switch between the last data symbol and a first data symbol of the first message;
a preparation time for the first payload; or
a processing time for a downlink channel that transmits the system information from the BS to the UE.

13. The method of claim 11, wherein the transmission of the random access preamble and transmission of the first payload are separated by a time gap, and
wherein the time gap is determined by at least one of:
a physical random access channel (PRACH) format;
time-domain resource allocation;
time slot format;
a tuning time for numerology switch between the random access preamble and the first payload;
a listen-before-talk mechanism between the BS and the UE;
a channel occupancy time between the BS and the UE;
a frequency band for the RACH procedure; or
a physical uplink shared channel (PUSCH) mapping type for the first message.

14. The method of claim 11, further comprising:
receiving, by the BS from the UE, a retransmission of the first message after the RAR window has lapsed, in response to a decoding failure of the first message.

15. The method of claim 14, wherein the random access preamble or a PUSCH occasion in time or frequency domain is re-selected for the re-transmitted first message.

16. The method of claim 14, wherein a payload is re-constructed with a different content than the first payload for the re-transmitted first message.

17. The method of claim 11, further comprising:
decoding the first payload from the first message;
in response to determining that the first payload was successfully decoded, preparing and transmitting, by the BS, the second message including the second payload indicating a decoding success; and
receiving, by the BS from the UE, an acknowledgement message indicative of a connection setup in response to the connection request within the RAR window.

18. The method of claim 17, wherein the acknowledgement message is received after a time gap since a last data symbol of the second message, and wherein the time gap is lower bounded by a value determined by at least one of:
a physical downlink shared channel (PDSCH) processing time;
a time slot format; and
whether the acknowledgement message is piggybacked on PUSCH.

19. The method of claim 17, wherein a timing advance offset is applied to adjust a timing offset on an uplink from the UE to the BS before the acknowledgement message is transmitted.

20. The method of claim 17, wherein the acknowledgement message is received over at least one of:
a physical uplink control channel (PUCCH);
uplink control information (UCI) piggybacked on PUSCH; and
an uplink reference signal.

21. A user equipment (UE) of wireless communication, comprising:
one or more memories storing processor-executable codes;
a transceiver configured to:
receive system information for initiating a random access channel (RACH) procedure;
transmit a first message including a random access preamble and a first payload of a connection request;
monitor for a second message in response to the first message during a random access response (RAR) window;
re-transmit the first message in response to determining based on the monitoring that no second message is received by the UE from the BS within the RAR window; and
one or more processors coupled with the one or more memories and individually or collectively operable to execute the code to cause the UE to:
re-transmit the first payload to the BS in response to determining that the second message is received by the UE from the BS within the RAR window, and that a second payload decoded from the second message indicates a fallback response; and
transmit an acknowledgement message to the BS in response to determining that the second message is received by the UE from the BS within the RAR window and that the second payload indicates a success response.

22. The UE of claim 21, wherein the processor is further configured to: determine that the second message is received by the UE from the BS within the RAR window; decode the second payload from the second message; re-transmit the first payload containing the connection request using the PUSCH within the RAR window in response to determining that the decoded second payload indicates a decoding failure of the first payload at the BS.

23. The UE of claim 22, wherein the processor is further configured to:
wait for a time gap after a last data symbol of the second message before re-transmitting the first payload,
wherein the time gap is determined by at least one of:
a PDSCH processing time;
a time slot format; or
a PUSCH preparation time.

24. The UE of claim 21, wherein the processor is further configured to:
obtain an indication of a length of the RAR window from RRC signaling when the UE is radio resource control (RRC) connected with the BS,
wherein the length of the RAR window overrides a previously obtained length of the RAR window information.

25. The UE of claim 21, wherein a length of the RAR window is determined based on at least one of:
a priority level of the first message;
a density of resource allocation to the first message; or
synchronization-signal-block (SSB) to occasion association periodicity.

26. A base station (BS) of wireless communication, comprising:
one or more memories storing processor-executable codes;
a transceiver configured to:
broadcast system information for initiating a random access channel procedure;
receive a first message including a random access preamble and a first payload of a connection request; and
one or more processors coupled with the one or more memories and individually or collectively operable to execute the code to cause the BS to:
determine whether at least a portion of the first message is decodable;
refrain from transmitting any message to the UE within a random access response (RAR) window in response to a decoding failure of the first message; and
wherein the transceiver is further configured to transmit a RAR message containing a second payload indicating a fallback response or a success response that is determined based on a type of the portion of the first message in response to a decoding success of at least the portion of the first message.

27. The BS of claim 26, wherein a first PDCCH symbol of the second message is searched by using a common search space when the UE is RRC inactive at a start of the RAR window.

28. The BS of claim 26, wherein a first PDCCH symbol of the second message is searched using a common search space (CSS) or a UE-specific search space (USS) when the UE is connected to the BS via a contention based random access (CBRA) procedure, or using the UE-specific search space (USS) when the UE is connected to the BS via a contention free random access (CFRA) procedure.

29. The BS of claim 26, wherein the RAR window is started at a starting point aligned with a first PDCCH symbol in a PDCCH search space of the second message.

30. The BS of claim 26, wherein a starting point of the RAR window is aligned with a first PDCCH symbol in an earliest CSS or USS for PDCCH of the second message under CBRA, and
wherein the starting point of the RAR window is aligned with the first PDCCH symbol in the earliest USS for the PDCCH of the second message under CFRA.

31. A non-transitory storage medium storing processor-executable instructions for a user equipment of wireless communication, the processor-executable instructions including instructions executable by a processor to:
receive system information for initiating a random access channel (RACH) procedure;
transmit a first message including a random access preamble and a first payload of a connection request;
monitor for a second message in response to the first message during a random access response (RAR) window;

re-transmit the first message in response to determining based on the monitoring that no second message is received within the RAR window;

re-transmit the first payload to the BS in response to determining that the second message is received by the UE from the BS within the RAR window, and that a second payload decoded from the second message indicates a fallback response; and transmit an acknowledgement message to the BS in response to determining that the second message is received by the UE from the BS within the RAR window and that the second payload indicates a success response.

32. The medium of claim 31, wherein the instructions further include instructions to:

search a first PDCCH symbol of the second message using a common search space when the medium is RRC inactive at a start of the RAR window.

33. The medium of claim 31, wherein the instructions further include instructions to:

search a first PDCCH symbol of the second message using a common search space (CSS) or a medium-specific search space (USS) when the medium is connected via a contention based random access (CBRA) procedure, or using the USS only when the medium is connected via a contention free random access (CFRA) procedure.

34. The medium of claim 31, wherein the instructions further include instructions to:

start a timer for the RAR window after a PUSCH occasion of the first message, wherein a starting point of the RAR window is aligned with a first PDCCH symbol in a PDCCH search space of the second message.

35. The medium of claim 31, wherein the instructions further include instructions to:

start a timer for the RAR window after a PUSCH occasion of the first message, wherein a starting point of the RAR window is aligned with a first PDCCH symbol in an earliest CSS or USS for PDCCH of the second message under CBRA, and wherein the starting point of the RAR window is aligned with the first PDCCH symbol in the earliest USS for the PDCCH of the second message under CFRA.

* * * * *